US012559222B2

(12) United States Patent
Smarsh et al.

(10) Patent No.: US 12,559,222 B2
(45) Date of Patent: Feb. 24, 2026

(54) LOCK DEFEATING SYSTEM FOR AN AIRCRAFT DOOR

(71) Applicant: Textron Aviation Inc., Wichita, KS (US)

(72) Inventors: Joseph Allan Smarsh, Andale, KS (US); Evan Michael Johnson, Wichita, KS (US); Timothy Bachman, Wichita, KS (US); Richard S. Conkling, Kechi, KS (US)

(73) Assignee: Textron Innovations Inc., Providence, RI (US)

( * ) Notice: Subject to any disclaimer, the term of this patent is extended or adjusted under 35 U.S.C. 154(b) by 210 days.

(21) Appl. No.: 18/362,719

(22) Filed: Jul. 31, 2023

(65) Prior Publication Data

US 2024/0035313 A1     Feb. 1, 2024

Related U.S. Application Data

(60) Provisional application No. 63/369,910, filed on Jul. 29, 2022.

(51) Int. Cl.
| | |
|---|---|
| *B64C 1/14* | (2006.01) |
| *E05B 77/30* | (2014.01) |
| *E05B 83/36* | (2014.01) |

(52) U.S. Cl.
CPC ............ *B64C 1/1461* (2013.01); *E05B 77/30* (2013.01); *E05B 83/36* (2013.01)

(58) Field of Classification Search
CPC .......... E05B 77/30; E05B 77/32; E05B 83/36; E05B 57/00; E05B 59/00; E05B 79/10;
(Continued)

(56) References Cited

U.S. PATENT DOCUMENTS

| | | | | | |
|---|---|---|---|---|---|
| 1,583,079 | A | * | 5/1926 | Lurie | E05B 63/12 70/483 |
| 1,895,594 | A | * | 1/1933 | Strandt | E05C 9/047 70/210 |

(Continued)

FOREIGN PATENT DOCUMENTS

| | | | | | |
|---|---|---|---|---|---|
| BR | 112021001174 | A2 | * | 4/2021 | B64C 1/1423 |
| CN | 108327890 | A | * | 7/2018 | B64C 1/1407 |

(Continued)

OTHER PUBLICATIONS

Amazon page, Closet Ball Door Catch Hardware Jiayi 2 Pack French Door Ball Catch Closet Ball Latch for Top of Door Adjustable Ball Catch Drive in Ball Latch for Invisible Pantry Ball Bearing Door Latch Black. Comments dated to 2020. Web page accessed Nov. 7, 2024 (Year: 2020). https://www.amazon.com/Jiayi-Hardware-Adjustable-Replacement-invisible/dp/B08S3H7XY5?th=1.

*Primary Examiner* — Steven A Tullia
(74) *Attorney, Agent, or Firm* — Avek IP, LLC

(57) ABSTRACT

A system and method for defeating a door lock. More specifically, a door having an outside door handle with a key-lock, and having an interior door handle of the type that includes both a paddle along with the handle runs the risk of being left in locked mode in the event of a mechanical malfunction. This problem has been overcome by mechanically linking the paddle on the interior handle to unlatch the key-lock.

20 Claims, 20 Drawing Sheets

(58) Field of Classification Search

CPC .......... E05B 79/22; E05B 85/06; E05B 85/26; B64C 1/1461; B64C 1/1415; E05C 19/007

USPC ........................................................... 70/101

See application file for complete search history.

(56) References Cited

U.S. PATENT DOCUMENTS

| | | | | |
|---|---|---|---|---|
| 2,682,763 A * | 7/1954 | Williams | ............... | E05C 9/047 |
| | | | | 70/144 |
| 3,596,482 A * | 8/1971 | Pollak | .................... | E05B 83/36 |
| | | | | 292/216 |
| 3,653,615 A | 4/1972 | Spence | | |
| 3,888,096 A * | 6/1975 | Huss | .................... | E05B 13/001 |
| | | | | 70/416 |
| 3,999,789 A * | 12/1976 | Maurits | ............... | E05B 65/1086 |
| | | | | 70/462 |
| 4,363,231 A * | 12/1982 | Kaveney, Jr. | ........... | E05B 83/36 |
| | | | | 70/489 |
| 4,418,552 A * | 12/1983 | Nolin | .................. | E05B 65/1086 |
| | | | | 70/92 |
| 4,725,085 A * | 2/1988 | Hu | .......................... | E05B 55/00 |
| | | | | 292/1.5 |
| 5,031,863 A | 7/1991 | Noble | | |
| 5,100,185 A * | 3/1992 | Menke | .................. | E05B 85/243 |
| | | | | 292/216 |
| 5,241,725 A | 9/1993 | Hamatani et al. | | |
| 5,667,169 A * | 9/1997 | Erben | .................... | B64C 1/143 |
| | | | | 244/129.4 |
| 5,715,713 A * | 2/1998 | Aubry | .................... | E05B 77/28 |
| | | | | 292/216 |
| 5,823,473 A * | 10/1998 | Odell | .................... | B64C 1/1415 |
| | | | | 292/216 |
| 6,168,114 B1 * | 1/2001 | Erben | .................... | B64C 1/143 |
| | | | | 49/153 |
| 6,454,210 B1 * | 9/2002 | Plattner | ................. | B64C 1/1415 |
| | | | | 244/129.5 |
| 6,457,675 B1 * | 10/2002 | Plude | .................... | B64C 1/1415 |
| | | | | 49/276 |
| 6,619,591 B2 * | 9/2003 | Erben | .................... | B64C 1/1407 |
| | | | | 244/129.4 |
| 6,997,414 B2 * | 2/2006 | Paradis | ................. | B64C 1/1415 |
| | | | | 49/327 |
| 8,201,777 B2 | 6/2012 | Wilson et al. | | |
| 8,347,667 B2 * | 1/2013 | Bacon | .................... | E05B 59/00 |
| | | | | 292/216 |
| 8,403,265 B2 * | 3/2013 | Gowing | .................... | B64C 1/14 |
| | | | | 244/129.5 |
| 8,783,616 B2 | 7/2014 | Roser et al. | | |
| 9,527,574 B2 * | 12/2016 | Steger | ........................ | B64C 1/32 |
| 10,378,237 B2 * | 8/2019 | Bacon | ................ | G07C 9/00174 |
| 10,392,838 B2 * | 8/2019 | Tomaszewski | ......... | E05B 81/90 |
| 10,746,378 B2 * | 8/2020 | Bachman | ............... | F21V 14/08 |
| 10,752,331 B2 | 8/2020 | Bessettes et al. | | |
| 10,871,013 B2 * | 12/2020 | Schwab | .................. | E05B 85/24 |
| 10,982,471 B2 | 4/2021 | Emrich et al. | | |
| 11,377,885 B2 * | 7/2022 | Bacon | .................... | E05B 83/44 |
| 11,619,067 B2 * | 4/2023 | Bush | .................... | E05B 17/047 |
| | | | | 244/129.5 |
| 11,692,379 B2 * | 7/2023 | Bacon | .................... | E05B 83/44 |
| | | | | 70/391 |
| 12,037,819 B2 * | 7/2024 | Samuelson | ........... | E05B 15/004 |
| 2006/0220410 A1 | 10/2006 | Luehr et al. | | |
| 2009/0045288 A1 | 2/2009 | Nakamura et al. | | |
| 2010/0096505 A1 | 4/2010 | De Freitas et al. | | |
| 2010/0109346 A1 | 5/2010 | Dieling et al. | | |
| 2011/0049299 A1 * | 3/2011 | Gowing | .................. | B64C 1/143 |
| | | | | 244/129.5 |
| 2013/0032660 A1 | 2/2013 | Wolf et al. | | |
| 2019/0120173 A1 | 4/2019 | Ghandour et al. | | |
| 2019/0169906 A1 | 6/2019 | Kumar et al. | | |
| 2019/0300142 A1 * | 10/2019 | Helsley | ................. | B64C 1/1407 |
| 2021/0229792 A1 | 7/2021 | Blum et al. | | |
| 2021/0348430 A1 | 11/2021 | Molinari | | |
| 2022/0136290 A1 | 5/2022 | Tendyra et al. | | |
| 2022/0381059 A1 * | 12/2022 | Cascone | .................. | B64C 1/14 |
| 2024/0067325 A1 | 2/2024 | Ducasse | | |

FOREIGN PATENT DOCUMENTS

| | | | | | |
|---|---|---|---|---|---|
| CN | 116220482 A | * | 6/2023 | ............. | E05B 77/30 |
| DE | 4031842 A1 | * | 4/1992 | ............. | E05B 83/36 |
| DE | 102016103625 A1 | * | 9/2017 | ............. | E05B 5/003 |
| EP | 1832701 A1 | * | 9/2007 | ............. | E04B 77/04 |
| EP | 2963211 A1 | * | 1/2016 | ........ | E05B 47/0001 |
| EP | 3275779 A1 | * | 1/2018 | .......... | B64C 1/1407 |
| EP | 3275779 B1 | * | 11/2019 | .......... | B64C 1/1407 |
| EP | 3995393 A1 | * | 5/2022 | .......... | B64C 1/143 |
| EP | 3967595 B1 | * | 4/2023 | .......... | B64C 1/1407 |
| GB | 606340 A | * | 8/1948 | ............. | E05B 83/36 |
| GB | 2268966 A | * | 1/1994 | ........ | E05B 63/0052 |
| GB | 2271374 A | * | 4/1994 | ............. | E05B 17/04 |
| JP | 2022048995 A | * | 3/2022 | .......... | B64C 1/1407 |
| WO | WO-2009051875 A2 | * | 4/2009 | .......... | B64C 1/1415 |
| WO | WO-2013172804 A1 | * | 11/2013 | .......... | B64C 1/1407 |
| WO | WO-2015140763 A1 | * | 9/2015 | .......... | E05B 15/022 |

* cited by examiner

710L
601c
601
618
601b
620
601d
601e
604
616
602
602a
620
601a
602a
601a
614
_FIG. 12C_

LOCK DEFEATING SYSTEM FOR AN AIRCRAFT DOOR

CROSS-REFERENCE TO RELATED APPLICATIONS

This application claims the benefit of U.S. Provisional Patent Application No. 63/369,910, filed Jul. 29, 2022, the entire contents thereof are herein incorporated by reference.

BACKGROUND OF THE INVENTION

1. Field

Embodiments of the invention relate generally to doors, and more specifically to load-bearing structural doors, doors having locking mechanisms, and doors having latching mechanisms.

2. Related Art

Various solutions to door locking mechanisms have been disclosed in the art. For example, U.S. Pat. No. 6,378,806 to Erben discloses a load bearing aircraft door. U.S. Pat. No. 10,183,734 to Scimone et al. discloses an aircraft that includes a support structure with a port extending through the support structure. U.S. Pat. No. 10,871,013 to Schwab discloses a load transfer interface for a vehicle door. U.S. Pat. No. 10,982,471 to Emrich et al. discloses a door of an aircraft having a latch system. U.S. Pat. No. 8,201,777 to Wilson et al. discloses a door of an aircraft that has a locking system. U.S. Patent Application Publication No. 2021/0348430 to Molinari discloses an aircraft door emergency opening device. U.S. Patent Application Publication No. 2020/0224462 to Renner et al. discloses a door locking system for an aircraft door. U.S. Patent Application Publication No. 2021/0347494 to Aguilar Ante et al. discloses a latch assembly. Various other door assemblies are disclosed in U.S. Patent Application Publication No. 2018/0319479 to Bessettes et al., and U.S. Patent Application Publication No. 2021/0229792 to Blum et al.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some aspects, the techniques described herein relate to an aircraft fuselage door system, the system including: a doorframe for an aircraft door, the doorframe located in an aircraft fuselage wall, the door being hingedly connected to the top of the doorframe, the door being configured to pivot downward or upward relative to a top edge of the door; a force-transferring unit being established between an inside edge of a side of the doorframe and an outside edge of an adjacent side of the door, the force-transferring unit, upon a closing of the door, compelling the door in a lateral direction relative to the doorframe; one or more door guiding and fitting arrangements on a bottom edge of the door, the one or more door guiding and fitting arrangements each config-ured to laterally align a bottom portion of the door upon the closing of the door; and a latching arrangement configured to secure the door into the doorframe after the force-transmitting unit and the one or more door guiding and fitting arrangements have already been engaged.

In some aspects, the techniques described herein relate to a door system including: one or more shear tie arrangements disposed on an inside edge of the doorframe, the one or more shear tie arrangements located at one or more respective positions, each shear tie arrangement configured to establish a structural load path from the door to the doorframe at each of the respective positions.

In some aspects, the techniques described herein relate to a door system wherein the force-transferring unit includes a rotating ball contained in a housing portion, the housing portion being located on one of the door or the frame, the ball being receivable into a receiving area defined into a receptacle located adjacent the ball on the other of the door or the frame.

In some aspects, the techniques described herein relate to a door system wherein the force-transferring unit is a ball-transfer unit.

In some aspects, the techniques described herein relate to a door system wherein the force-transferring unit is config-ured to provide initial contact between the door and the door frame.

In some aspects, the techniques described herein relate to a door system wherein the force-transferring unit is located on the forward side of the doorframe.

In some aspects, the techniques described herein relate to a door system wherein the rotating ball in the force-trans-ferring unit is on the doorframe and is configured to push the door aft upon the closing.

In some aspects, the techniques described herein relate to a door system wherein the ball remains in contact with and is received into the receptacle upon the closing.

In some aspects, the techniques described herein relate to a door system wherein the one or more door guiding and fitting arrangements each include load fittings each received into a respective load-fitting receptacle.

In some aspects, the techniques described herein relate to a door system wherein the load fittings are outwardly tapered towards a point relative from where they are mounted on the bottom edge of the door to reach a tip.

In some aspects, the techniques described herein relate to a door system wherein the one or more door guiding and fitting arrangements are configured to modify contact between the bottom of the door and a lower portion of the doorframe such that, on the closing the shape of doorframe adjusted to the shape of the door.

In some aspects, the techniques described herein relate to a door system wherein each load fitting in the one or more door guiding and fitting arrangements is mounted on the lower edge of the door, and each respective load-fitting receptacle exists on a lower portion door frame.

In some aspects, the techniques described herein relate to a door system wherein each load-fitting receptacle includes opposing upright rollers between which a pair of angled faces of each load fitting are received.

In some aspects, the techniques described herein relate to a door system wherein one or more load path tie arrange-ments are provided between an outer door edge and a frame portion to transfer weight from the door to the frame.

In some aspects, the techniques described herein relate to a door system wherein the one or more load path tie arrangements each include a tie post and a shear tie.

In some aspects, the techniques described herein relate to a door system wherein upon the closing, the tie post fits and is secured into the shear tie accomplishing a transfer of a weight from the door to the doorframe and a location of the load path tie arrangement and adjusting the shape of the door.

In some aspects, the techniques described herein relate to a door system wherein the force-transferring unit, one or more door guiding and fitting arrangements, and one or more load path tie arrangements are configured to reshape the doorframe and position the door leaf inside the doorframe during the closing.

In some aspects, the techniques described herein relate to an aircraft door closure process including: locating a force-transferring unit between a forward inside edge of an aircraft doorframe and a forward outside edge of an adjacent side of the door to make initial contact with and locate an aircraft door within the doorframe; and configuring a lower portion of the aircraft door and a corresponding portion of the aircraft doorframe to include one or more door guiding and fitting arrangements to laterally align the lower portion of the aircraft door with the corresponding portion of the frame upon the closing of the door.

In some aspects, the techniques described herein relate to a process including: establishing one or more load-path tie arrangements between the aircraft door and the aircraft frame to transfer a weight from the aircraft door to the doorframe and adjust a shape of the door.

In some aspects, the techniques described herein relate to a process including: configuring the force-transferring unit to initially engage the door upon the closing; configuring the one more door guiding and fitting arrangements to engage the door after the force-transferring unit has already been engaged; configuring the load-path tie arrangements to engage the door after the force-transferring unit and the one or more door guiding and fitting arrangements have already engaged the door; and providing a latch arrangement enabling the door to be secured in the frame for a flight.

In some aspects, the techniques described herein relate to an aircraft door including: a pin latch system on an aircraft door; a driving mechanism configured to translate the pin latch system in and out of a receptacle in an aircraft doorframe during normal operation; the pin system including a rod including an activation mechanism and an external thread arrangement; a pin bearing end connected to the driving mechanism; an extending member supporting an insertion end; the pin bearing end including internal threads configured to cooperate with the external thread arrangement on a first end of the rod; the extending member including internal threads configured to cooperate with the external thread arrangement on the second end of the rod; and the internal threads on the pin bearing end and the extending member and the external thread arrangement on the rod together configured to decrease or increase an overall length of the pin latch system using the activation mechanism.

In some aspects, the techniques described herein relate to an aircraft door wherein the external threads on the first end of the rod exist and are reversely oriented with respect to the threads on the second end of the rod.

In some aspects, the techniques described herein relate to an aircraft door wherein the activation mechanism is configured to receive a tool for rotation of the rod.

In some aspects, the techniques described herein relate to an aircraft door wherein the activation mechanism is integrated with and rotates with the rod, has a hexagonal shape, and is coaxial with the rod.

In some aspects, the techniques described herein relate to an aircraft door wherein a rotation of the activation mechanism in a first axial direction shortens the overall length of the pin latch system, and a rotation of the activation system in a second opposite axial direction shortens the overall length of the pin latch system.

In some aspects, the techniques described herein relate to an aircraft door including: a pin keeper removably coupled to the rod configured to prevent axial rotation of the rod.

In some aspects, the techniques described herein relate to an aircraft door wherein the pin keeper is removably attached to the rod by a fastener.

In some aspects, the techniques described herein relate to an aircraft door wherein the pin keeper prevents rotation of the rod within either of the extending member or the pin bearing end.

In some aspects, the techniques described herein relate to an aircraft door wherein the pin keeper interfaces with the external thread arrangement of the rod.

In some aspects, the techniques described herein relate to an aircraft door wherein a first end of the pin keeper fits into a receiving groove configured into the extending member and a second end of the pin keeper fits into a groove configured into the pin bearing end to lock against rotation.

In some aspects, the techniques described herein relate to an aircraft door wherein the pin keeper is configured to lock the pin latch system at a length desired for normal operation of the pin latch system.

In some aspects, the techniques described herein relate to an aircraft door wherein the pin keeper includes laterally extending tangs designed to establish the length desired for normal operation.

In some aspects, the techniques described herein relate to an aircraft door wherein the pin latch system is configured to enable clearance from the receptacle in the event the driving mechanism for the pin latch system is disabled.

In some aspects, the techniques described herein relate to an aircraft door wherein the insertion end is configured to aid in locating and inserting.

In some aspects, the techniques described herein relate to an aircraft door wherein the insertion end includes an angled portion which is angled to a tip.

In some aspects, the techniques described herein relate to an aircraft door wherein a penetration of the insertion end past the angled portion to a body portion results in a snug fit in the receptacle.

In some aspects, the techniques described herein relate to an aircraft door wherein the drive mechanism is a cam which is rotated by a door handle on the aircraft door.

In some aspects, the techniques described herein relate to an aircraft door wherein an access panel is provided on the aircraft door, the access panel providing access to a user to the activation mechanism.

In some aspects, the techniques described herein relate to a system for use in unlatching an aircraft door, the system including: a pin system, the pin system configured for insertion into a receptacle in a door frame; the pin system configured to be operated primarily by a driving mechanism in the aircraft door, the driving mechanism configured to present the pin system in or out of an aircraft doorframe during normal operation; and the pin system including a backup retraction subsystem, the backup subsystem configured to allow for user access and manual retraction of the pin system from the receptacle upon a mechanical failure.

In some aspects, the techniques described herein relate to a pin latch for an aircraft door including a backup length modification subsystem, the backup length modification system including: a threaded rod having reversely oriented threads on each end; an extending member arranged on an opposite end of the threaded member from a bearing member, the bearing member configured to drive the pin latch under ordinary operation; the extending member and pin bearing members being reversely internally threaded and being translatable apart while being also being secured against rotation; a removable pin keeper, the pin keeper being securable to the threaded member locking an overall length of the pin latch at a length for ordinary operation; a manual activation mechanism concealed behind a removable panel, the manual activation mechanism configured to drive the threaded member in the event of a mechanical failure.

In some aspects, the techniques described herein relate to an aircraft door including: an exterior door handle assembly including a key-operated lock, the key-operated lock being operable to a locked position where an outstanding tab on the key-operated lock is rotated between a first locked position and a second unlocked position; an interior door handle assembly including a paddle portion and a handle portion, the paddle portion being operated to allow for operation of the handle portion, the paddle portion being operably linked via a mechanical system to an opposing outwardly extending blocking member; the blocking member, when the paddle portion is not being actuated by a user, and when the key is in the locked position, existing in blocking mode where the outstanding tab prevents an opening of the door; and the blocking member, when the paddle portion is actuated by a user, existing in an unblocked mode where the outstanding tab of the key-operated lock does not block opening of the door on an actuation of the handle on the exterior door assembly.

In some aspects, the techniques described herein relate to an aircraft door wherein the blocking member is a cam on an axis of rotation internal to the door.

In some aspects, the techniques described herein relate to an aircraft door wherein the mechanical system includes a rod configured to rotate on an axis upon activation of the paddle, the rod imparting rotation used in operating the blocking member.

In some aspects, the techniques described herein relate to an aircraft door wherein the mechanical system includes a shaft configured to rotate on an axis upon activation of the paddle, the shaft imparting rotation used in operating the blocking member.

In some aspects, the techniques described herein relate to an aircraft door wherein the mechanical system includes an arm that imparts tension into a cable, the cable contributing in imparting rotation of the blocking member.

In some aspects, the techniques described herein relate to an aircraft door wherein the mechanical system includes a fairlead that the cable slides around to reach a bellcrank which is included in the imparting of rotation to the blocking member.

In some aspects, the techniques described herein relate to an aircraft door wherein the mechanical system includes a rod which is driven by the bellcrank to contribute to the rotation of the blocking member.

In some aspects, the techniques described herein relate to an aircraft door wherein the mechanical system includes a seesaw rotating on an axle at a first end, the seesaw being configured to receive pressure from the rod at an intermediate location and cause the axle to operate the blocking member into an unlocked position.

In some aspects, the techniques described herein relate to an aircraft door wherein the mechanical system includes a tension spring attached to a second end of the seesaw, the tension spring having a tension level, the tension spring biasing the blocking member towards blocked mode when the paddle is not being depressed by a user to overcome the tension level provided by the tension spring.

In some aspects, the techniques described herein relate to a door including: an exterior handle system having a lock tab which rotates to catch on an axially mounted blocking member when in locked mode and is rotatable to an unlocked mode where the tab does not catch on the blocking member; an interior handle system including a paddle which is operated by a user to gain the ability to operate a handle in the interior handle system; and the paddle rotating on a shaft, the shaft configured to impart mechanical rotation to the blocking member via a mechanical system.

In some aspects, the techniques described herein relate to an aircraft door wherein the blocking member is a key operable cam.

In some aspects, the techniques described herein relate to an aircraft door wherein the mechanical system includes an arm on the shaft imparts tension into a cable, the cable contributing to impart rotation of the blocking member.

In some aspects, the techniques described herein relate to an aircraft door wherein the cable slides around a fairlead in imparting rotation to the blocking member.

In some aspects, the techniques described herein relate to an aircraft door wherein the cable, after sliding around the fairlead, rocks a bellcrank to impart rotation to the blocking member.

In some aspects, the techniques described herein relate to an aircraft door wherein the mechanical system includes a rod which is driven by the bellcrank to contribute to the rotation of the blocking member.

In some aspects, the techniques described herein relate to an aircraft door wherein the mechanical system includes a seesaw which operates on an axle, the seesaw being rocked at a first end by the rod resulting in a rotation of the axle on which the blocking member is rotatable into the unlocked position.

In some aspects, the techniques described herein relate to an aircraft door wherein a tension spring is attached to a second end of the seesaw, the tension spring having a tension level, the tension spring biasing the blocking member towards blocked mode when the paddle is not being depressed by a user.

In some aspects, the techniques described herein relate to a lock-defeat process for use with a door having a first handle having a key-lock arrangement on a first side of the door and a paddle associated with a second handle existing on a second side of the door, the process including: mechanically linking the paddle associated with the second handle to the key-lock associated with the first handle such that the operation of the paddle maintains an unlatching of the key-lock.

In some aspects, the techniques described herein relate to a lock-defeat process including: accepting rotation from the paddle to rotate a cam away from a blocked position to defeat the key-lock.

In some aspects, the techniques described herein relate to a process including: accomplishing the accepting step by receiving drive from the paddle into an intermediate portion of a seesaw rotating on an axle, and biasing an opposite end of the seesaw using a tension spring to return the cam to a blocking position upon a release of the paddle.

BRIEF DESCRIPTION OF THE SEVERAL VIEWS OF THE DRAWINGS

Embodiments of the invention are described in detail below with reference to the attached drawing figures, wherein:

FIG. 12C illustrates the door pin of FIG. 12A inserted into the receptacle of FIG. 12B, in an embodiment;

Figure 1:
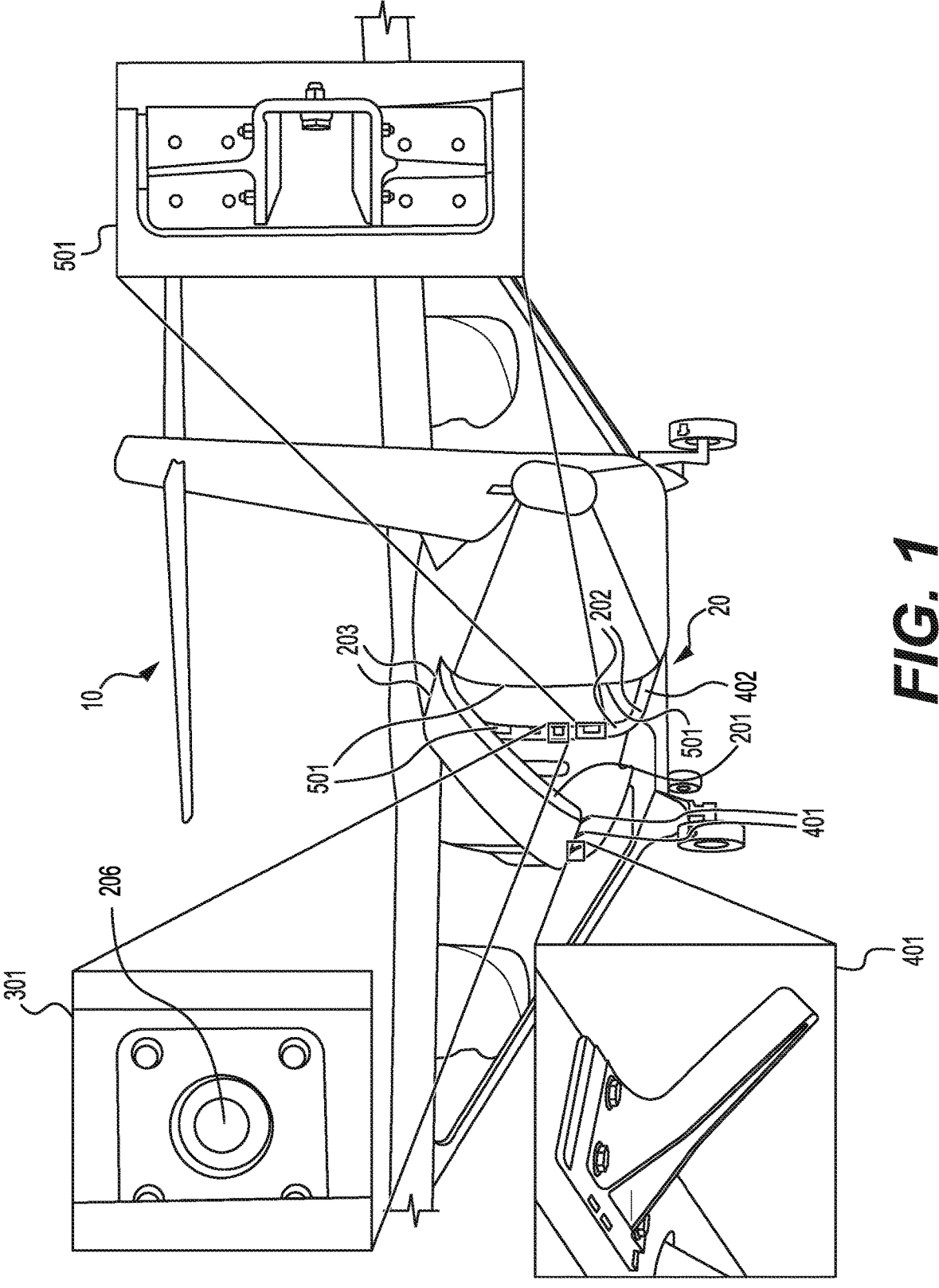
FIG. 1 shows an aircraft with a load-bearing, structural door, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Cargo doors located on transportation vehicles may be required to span a significant portion of the frame of the vehicle to allow for certain large cargo carriers to fit through an opening of the vehicle. On an aircraft, the doors may be so large with respect to the aircraft that, when closed, the doors provide structural support to the aircraft frame and contribute to the structural integrity and rigidity of the aircraft frame. When the doors are opened, significant deformation may occur. For example, deformation of the aircraft fuselage, such as twisting or sagging, may occur when the door is open. The deformation may alter a shape of the doorframe surrounding the door such that closing the door becomes troublesome since the shape of the doorframe no longer matches the shape of the door.

Moreover, aircraft doors must be designed to allow occupants to exit the aircraft through the door even if the door is locked from the exterior. Typically, lock mechanisms that secure aircraft doors from the outside include locked non-moving elements of the door mechanism to secure the door. However, certain aircraft door designs may have opening mechanisms which favor the use of a mechanism that locks live parts of the door mechanism to create a single-action door lock defeat. A single-action door lock defeat is desirable for being simple to operate by a user and for meeting regulations associated with opening of emergency exits.

Additionally, mechanisms should be provided for in which the door can still be opened in the event of door jamming such that said mechanisms do not damage the aircraft. A jammed door could be disassembled to allow entry to an aircraft, but disassembly presents a high risk of damage to the aircraft and is burdensome and time consuming.

Embodiments disclosed herein are configured to address these issues with a load-bearing door having straining and securing devices on the door leaf and doorframe. The door leaf and associated components work to re-form the doorframe into a shape that can fit the door after deformation of the doorframe and return the door to a load-bearing, structurally sound, flight-worthy state. In embodiments, the structural door comprises a ball transfer unit attached to the doorframe that contacts the door leaf to begin the realignment process. Once the ball transfer unit is in contact, load fittings contact entry points on the door frame and provide additional deformation of the door frame towards the correct position. Next, forward and aft shear ties on the doorframe are engaged by tie posts on the door leaf to provide additional deformation of the door frame for alignment with the door. The door is then closed and secured using four pins which engage progressively to compensate for the deformed shape of the doorframe. Given this setup, the door closure process does not require excessive force (e.g., an ordinary person may close the door by hand).

In embodiments, a lock defeat mechanism is provided for opening an aircraft door from within the cabin via a handle and paddle, which is operated with a simple single-action by a user. The motion of grabbing the handle requires that the operator's fingers push the paddle out of the way to gain access to the handle: the paddle actuates a lock defeat mechanism while the handle actuates a door latching mechanism, therefore in operation both mechanisms are actuated in series with a single motion of grabbing the handle by the user and unlatch the door leaf from the door frame.

In embodiments, door pins are provided that may be accessed from the exterior of the aircraft in the event of door jamming so that the door may still be opened by someone outside the aircraft. Each of the door pins may be contained behind access panels on the door. Each pin comprises a pin keeper, a central threaded rod, and a latch receptacle. First, the access panels are removed, allowing the pin keepers to be retrieved from the rods. Once the pin keepers are removed, turning the threaded rods lifts the pins out of the doorframe, allowing the door to be opened. The process may be performed with non-specialized hand tools and without damage to the aircraft.

FIG. 1 shows an exemplary vehicle 10 having a load-bearing door 20. A door leaf 201 rests inside doorframe 202 when door 20 is closed, and door leaf 201 opens outside of doorframe 202 when door 20 is open. Door leaf 201 is rotatably coupled to doorframe 202 via hinge system 203, and door leaf 201 is configured to rotate about hinge system 203. Hinge system 203 may include one or more hinges mechanically coupled to both door leaf 201 and doorframe 202 enabling rotation therebetween. Hinge system 203 may comprise a plurality of hinges or other rotatable means.

Door leaf 201 comprises a ball transfer unit receptacle 302, load fittings 401, and tie posts 502. Doorframe 202 comprises ball transfer unit 301 (on the back edge of door leaf 201 in FIG. 1, but can be seen in FIG. 8), load fitting receptacles 402, and shear ties 501. Without departing from the scope hereof, paired receptacles and fittings may be alternately arranged between the door and the doorframe; for example, door leaf 201 may comprise ball transfer unit 301 while doorframe 202 may comprise ball transfer unit receptacle 302 in a reversed arrangement.

Figure 2:
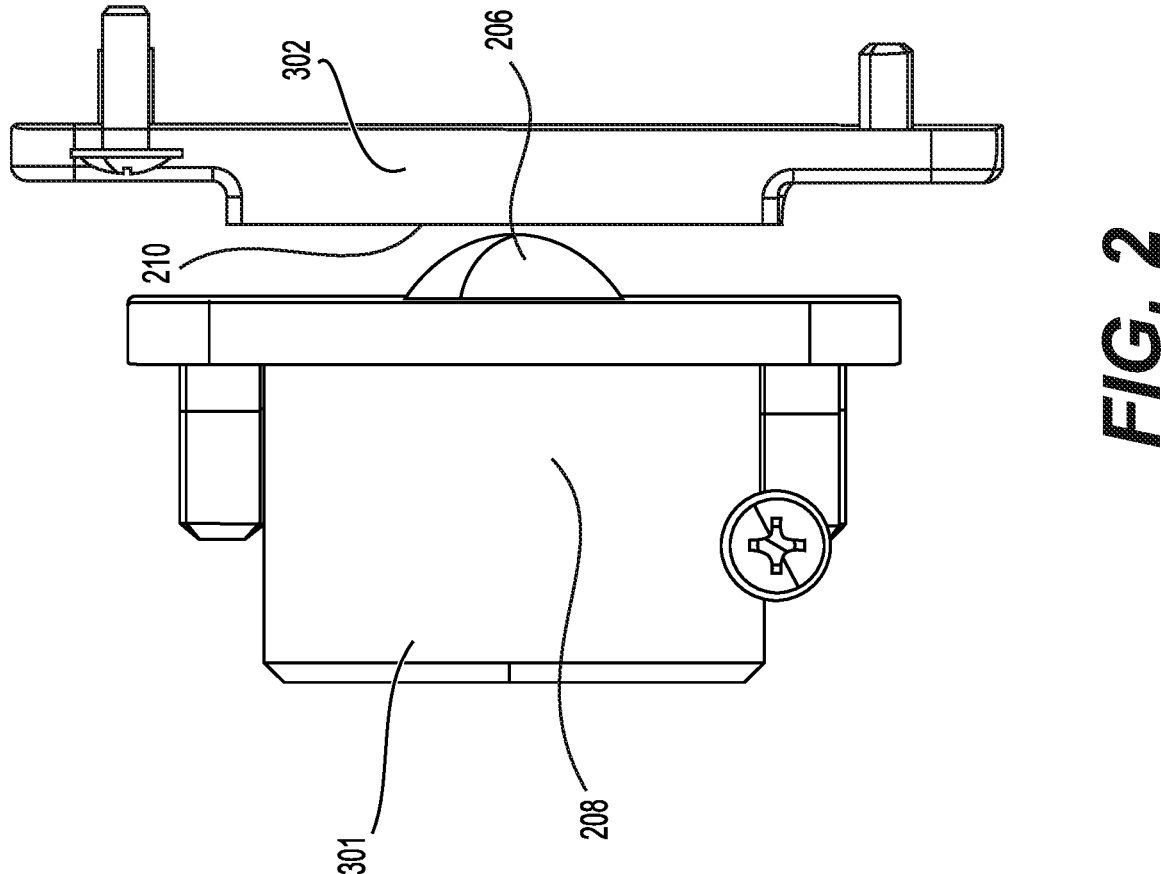
FIG. 2 is a side view illustrating a load-bearing ball transfer, in an embodiment.

FIG. 2 illustrates an exemplary ball transfer unit 301 and a ball transfer unit receptacle 302. In an embodiment, ball transfer unit 301 is attached to a doorframe 202, while ball transfer unit receptacle 302 is attached to door leaf 201. Those skilled in the art will recognize that the ball portion 301 includes a rotating ball 206 which is contained in a housing portion 208. As door 20 is closed and door leaf 201 is moved into doorframe 202, the ball of ball transfer unit 301 is configured to contact ball transfer unit receptacle 302 such that ball portion 206 is received into a corresponding recess or aperture 210 established in the ball transfer receptacle 302. In embodiments, contact between ball 206 of ball transfer unit 301 and ball transfer unit receptacle 302 provides an initial contact between door 20 and door leaf 201. Ball transfer unit 301 is mounted on an inner edge of doorframe 202 and ball transfer unit receptacle 302 is mounted on an outer edge of door leaf 201. In embodiments, ball transfer unit 301 is located on the forward side of doorframe 202 (see FIG. 1) such that the ball of ball transfer unit 301 faces aft, and ball transfer unit receptacle 302 is located on an outer edge of door leaf 201 facing forward for receiving the ball of ball transfer unit 301. Alternatively, the ball transfer arrangement could be located on the other side of the door, or multiple units could be used, one or more on one side, and one or more on the other. With ball transfer unit 301 and ball transfer unit receptacle 302 located on the forward side of door 20, door leaf 201 is pushed slightly aft as contact is made. Ball transfer unit 301 may remain in contact with ball transfer unit receptacle 302 during the closure of door 20 and during any time that door 20 is closed.

Figure 3:
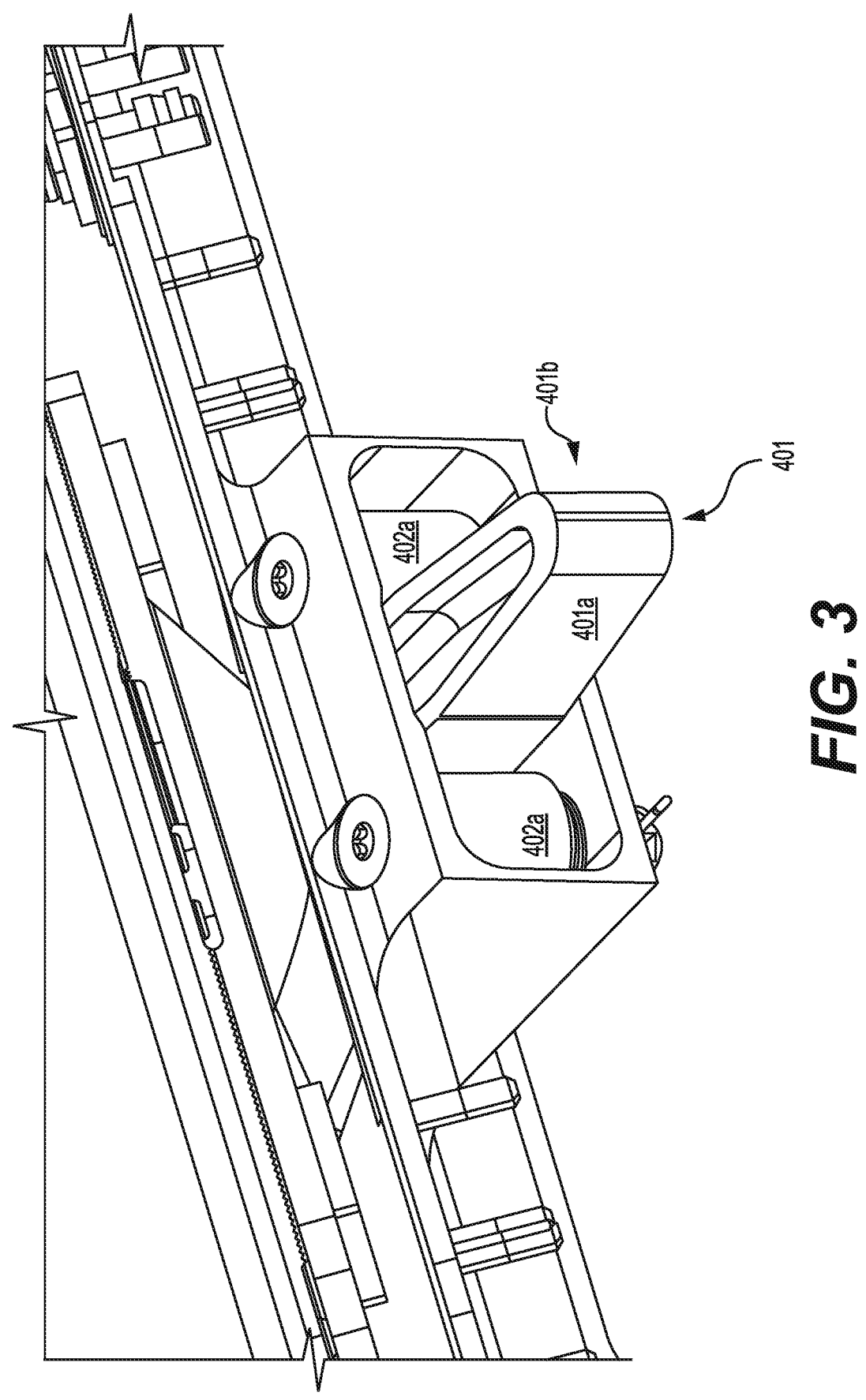
FIG. 3 illustrates a mounting fitting arrangement. in an embodiment.

FIG. 3 illustrates an embodiment of a door guiding and fitting arrangement including a load fitting 401 which will be received by a load fitting receptacle 402. In an embodiment, a trio of load fittings 401 are attached to door leaf 201 and corresponding load fitting receptacles 402 are attached to doorframe 202. The load fittings 401 are positioned such that they enter the load fitting receptacles 402 during closure of door 20. Any number of load fittings 401 may exist on door leaf 201, and a plurality of load fitting receptacles 402 may exist on a doorframe 202 with each fitting entering into a particular receptacle upon closure of door 20. (FIG. 8 also shows these fittings, but the figure is of the door, and it should be understood that the receptacles 402 are actually on the frame shown in other figures. The receptacles 402 have been added to FIG. 8 only to show the relationship with the fittings 401.)

Load fittings 401 may be designed such that the edges of the load fittings 401a and 401b are non-parallel, and the width of load fitting 401 decreases from the mounting of the load fitting to the end of the load fitting. In other words, the load fittings are outwardly tapered towards a point relative from where they are mounted on the leaf. This allows for the tip of each load fitting 401 to have a margin of error for receipt into each corresponding receptacle 402 and then guide and provide a centering function as the load fitting 401 penetrates the receptacle further. This also modifies contact between fitting 401 and receptacle 402 such that, as door leaf 201 is closed, fitting 401 is drawn into a specific place relative to receptacle 402, and as receptacle 402 is mounted to doorframe 202, the shape of doorframe 202 is more readily adjusted to the shape of door leaf 201. Additionally, the one or more load fitting receptacles 402 may comprise fitting assistance members 402a such that load fitting 401 is more easily fitted into receptacle 402 as door leaf 201 enters doorframe 202. The opposing fitting assistance members are, in embodiments, upright rollers which engage both angled sides 401a of the load fitting. The view of rollers 402a after insertion by the load fitting 401 can be seen in detail in FIG. 3. Fitting assistance members 402a can alternatively be some arrangement other than the upright rollers described.

Figure 4:
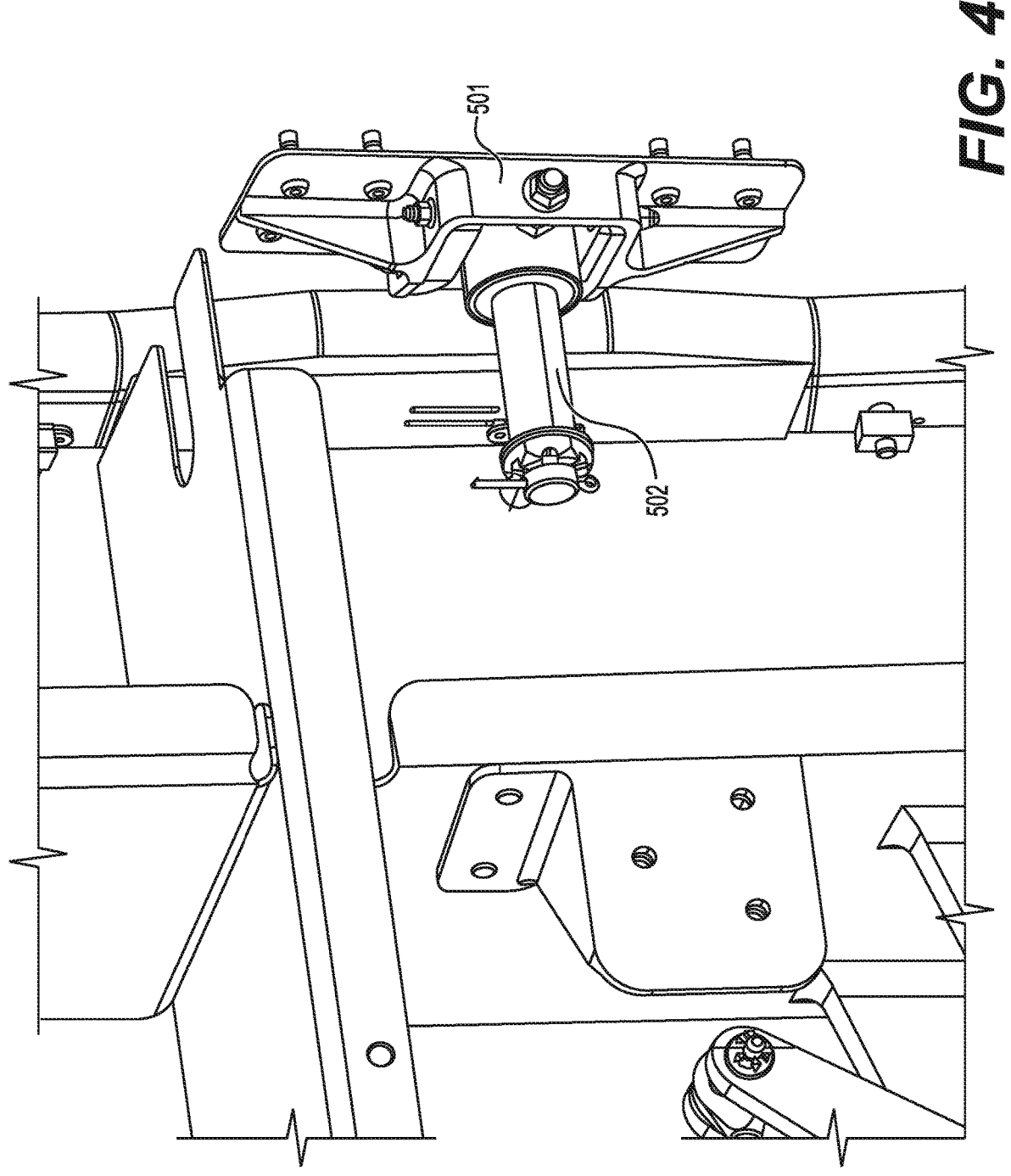
FIG. 4 shows a shear tie arrangement, in an embodiment.

FIG. 4 illustrates a load path tie arrangement including a shear tie 501 and a tie post 502. One or a plurality of shear ties 501 may be attached to doorframe 202, and one or a plurality of tie posts 502 may be attached to door leaf 201 in door 20. Each tie post 502 may fit into a shear tie 501 upon closure of door 20. As tie post 502 contacts shear tie 501, weight is transferred from door leaf 201 to doorframe 202, adjusting the shape of doorframe 202 to more readily accept door leaf 201. In other words, as each shear tie 501 and tie post 502 make contact the load is transferred from one to the other becoming a structural load path.

Figure 5:
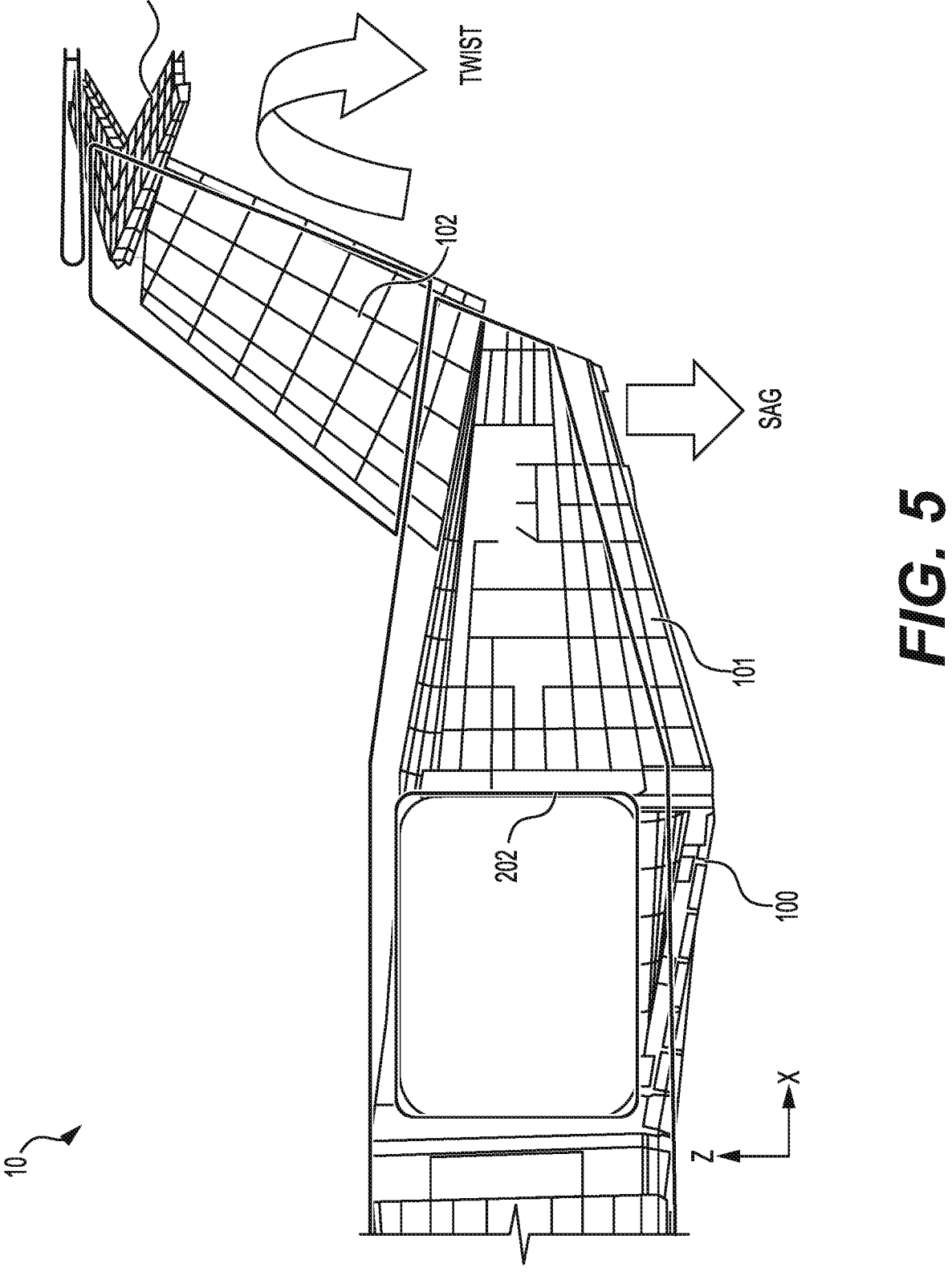
FIG. 5 demonstrates deformation of an aircraft structure that may occur when the load-bearing, structural door of FIG. 1 is open.

FIG. 5 illustrates exemplary deformation of vehicle 10 that may occur when load-bearing door 20 is opened. FIG. 5 is not necessarily to scale, but instead is drawn to emphasize the deformation. Exemplary deformation of vehicle 10 includes twisting and sagging. Twisting includes a rotation of the frame about the longitudinal axis of vehicle 10. Sagging includes a downward bending of the frame of fuselage 100 at the tail 101 of the vehicle 10. Additionally, the vertical stabilizer 102 and horizontal stabilizer 103, which are attached to tail 101, are displaced from their desired positions along with tail 101 once door 20 is open. A depiction of aircraft 10 in which door leaf 201 is closed within doorframe 202 is shown in FIG. 5 to illustrate the normal position of the fuselage 100, tail 101, vertical stabilizer 102, and horizontal stabilizer 103 in comparison to the deformed/displaced shape of vehicle 10 when door leaf 201 is open. The aircraft is not flight-worthy when fuselage 100, tail 101, vertical stabilizer 102, and horizontal stabilizer 103 are deformed and displaced as shown in FIG. 5.

Due to deformation of vehicle 10 and the large size of doorframe 202 relative to vehicle 10, the doorframe 202 also undergoes deformation when door 20 is open. The deformation of doorframe 202 may be substantial enough to prevent closing of door 20 without assistance. In other words, door leaf 201 may no longer fit within doorframe 202 once removed. Therefore, reforming of the shape of doorframe 202 may be required to reinstall the door leaf 201 into doorframe 202 (i.e., close door 20). Moreover, vehicle 10 must be returned to an operable state in which tail 101, vertical stabilizer 102, and horizontal stabilizer 103 are no longer deformed or out of place due to the deformation of fuselage 100 when door 20 is opened. For a load-bearing structural door 20, reforming of the shape of the doorframe 202 is necessary to remedy the deformation and displacement of fuselage 100, tail 101, vertical stabilizer 102, and horizontal stabilizer 103. As further described below, reforming of doorframe 202 may be applied via components of door leaf 201 and doorframe 202.

Figure 6:
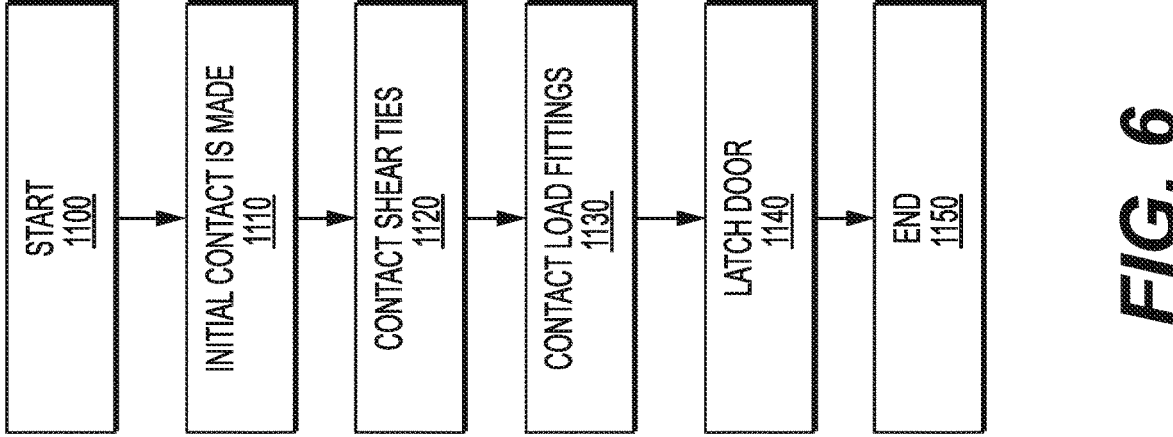
FIG. 6 is a block diagram illustrating steps of a method for refitting a structural door within a deformed doorframe, in an embodiment.
Figure 6:
Figure 6:
Figure 7:
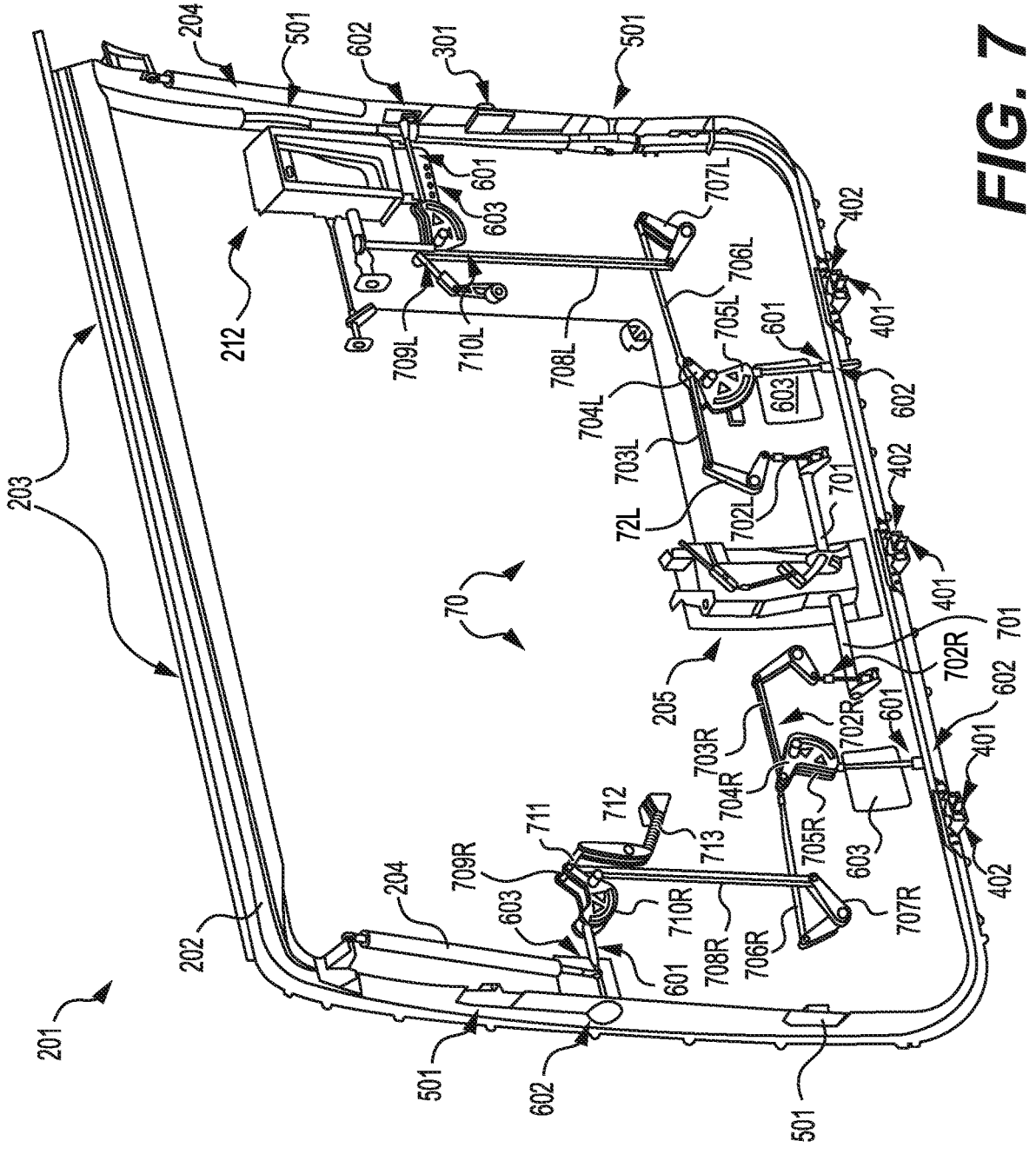
FIG. 7 shows components of a vehicle door, in an embodiment.
Figure 8:
FIG. 8 is a close-up view of the vehicle door of FIG. 7.
Figure 9:
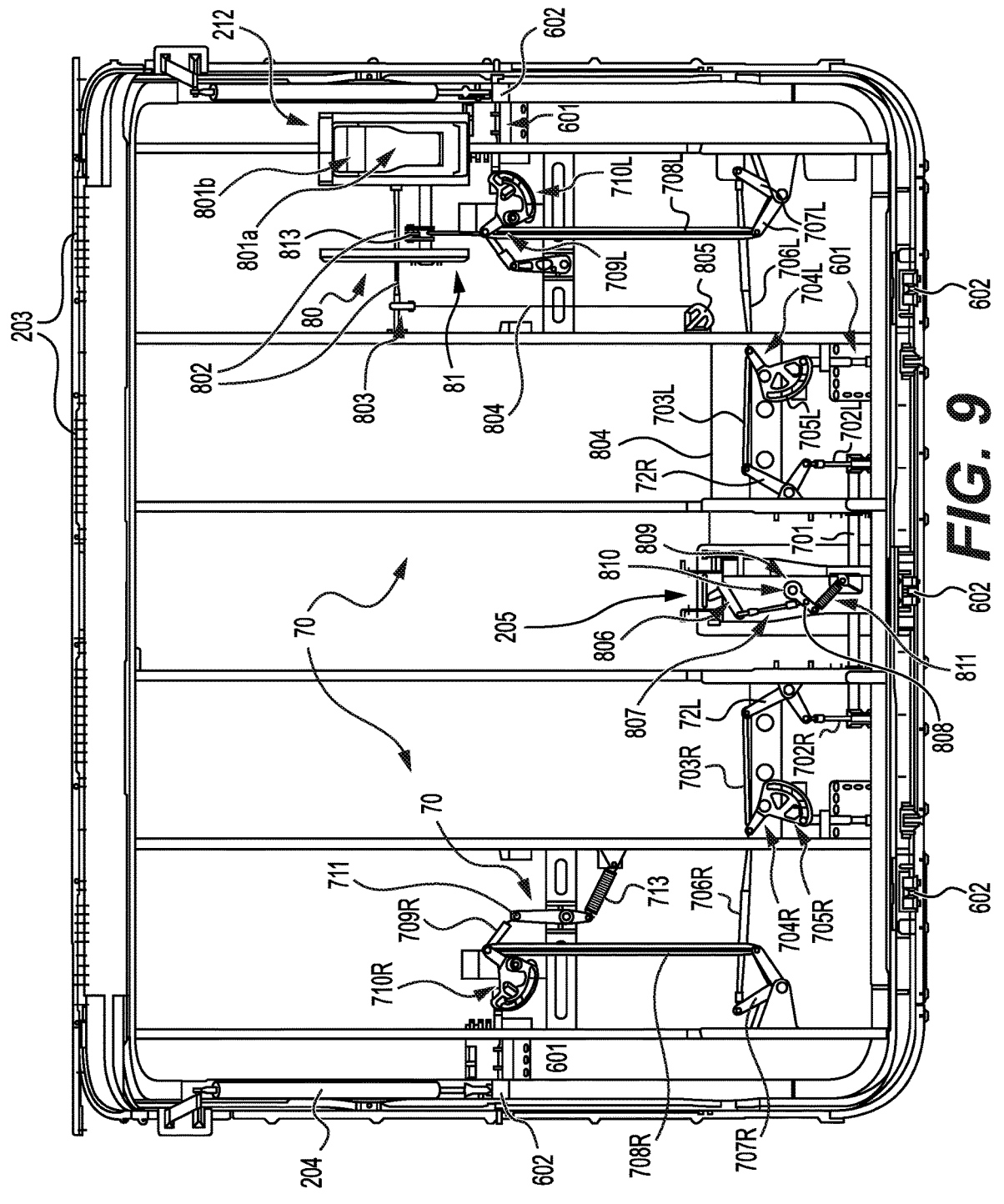
FIG. 9 provides another view of the vehicle door of FIG. 8.

FIG. 6 illustrates an embodiment of a door closure process 110 that allows a load-bearing door 20 to be closed, with doorframe 202 realigned for reception and proper latching of door leaf 201 after an undoing of deformation of a vehicle body as depicted in FIG. 2. Process 110 begins during closure of door 20 when components of door leaf 201 first make contact with components of doorframe 202, shown as step 1100. FIGS. 7, 8, and 9 contain embodiments of components that are configured to undergo process 110.

In step 1110, initial contact is made between components of door leaf 201 and components of doorframe 202. In an embodiment, the contact happens between ball transfer unit 301 and ball transfer unit receptacle 302. Door leaf 201 partially transfers force (e.g., weight) to doorframe 202.

In step 1120, nearer to full closure, contact is made between shear ties 501 and tie posts 502 mounted on door 20. In an embodiment, one or a plurality of shear ties 501 are mounted on doorframe 202 while one or a plurality of tie posts 502 are mounted on door leaf 201. The tie posts 502 are configured to be receivable and securable in the shear ties 501. In an example of step 1130, shear ties 501 mounted on doorframe 202 contact tie posts 502 mounted on door leaf 201 during closure of door 20. The contact between shear ties 501 and tie posts 502 causes doorframe 202 to strain. As tie posts 502 are on door leaf 201, doorframe 202 is thus strained into a shape more akin to that of door leaf 201. In an embodiment, the forces between tie posts 502 and shear ties 501 are exerted on doorframe 202 such that doorframe 202 is re-formed into a shape that can accept door leaf 201.

In step 1130, at a door leaf position even nearer to full closure, further contact between components on door leaf 201 and doorframe 202 is made. In an embodiment, load fittings 401 on door leaf 201 contact load fitting receptacles 402 on doorframe 202. Load fittings 401 thus transfer force (e.g., weight) from door leaf 201 to load fitting receptacles 402, and thus transfer force from door leaf 201 to doorframe 202. The transfer of force causes strain of doorframe 202, re-forming it into a shape that is more capable of accepting door leaf 201. In an embodiment, one or a plurality of load fittings 401 may be fitted to the bottom of door leaf 201, and one or a plurality of load fitting receptacles 402 may be fitted to the bottom of doorframe 202 such that each load fitting 401 is configured to contact a respective load-fitting receptacle 402. Contact between load fittings 401 and load-fitting receptacles 402 exerts force from load fittings 401 onto load-fitting receptacles 402 which assists in reforming doorframe 202 to a shape capable of accepting door leaf 201.

Prior to step 1140, door 20 has become effectively closed, but not latched. That is, door leaf 201 is substantially located within doorframe 202. In step 1140, door 20 is latched. In an example of step 1140, door 20 is latched when an exterior handle 205 is actuated. In another example of step 1140, door 20 is latched when an interior handle assembly 212 is actuated.

Figure 10A:
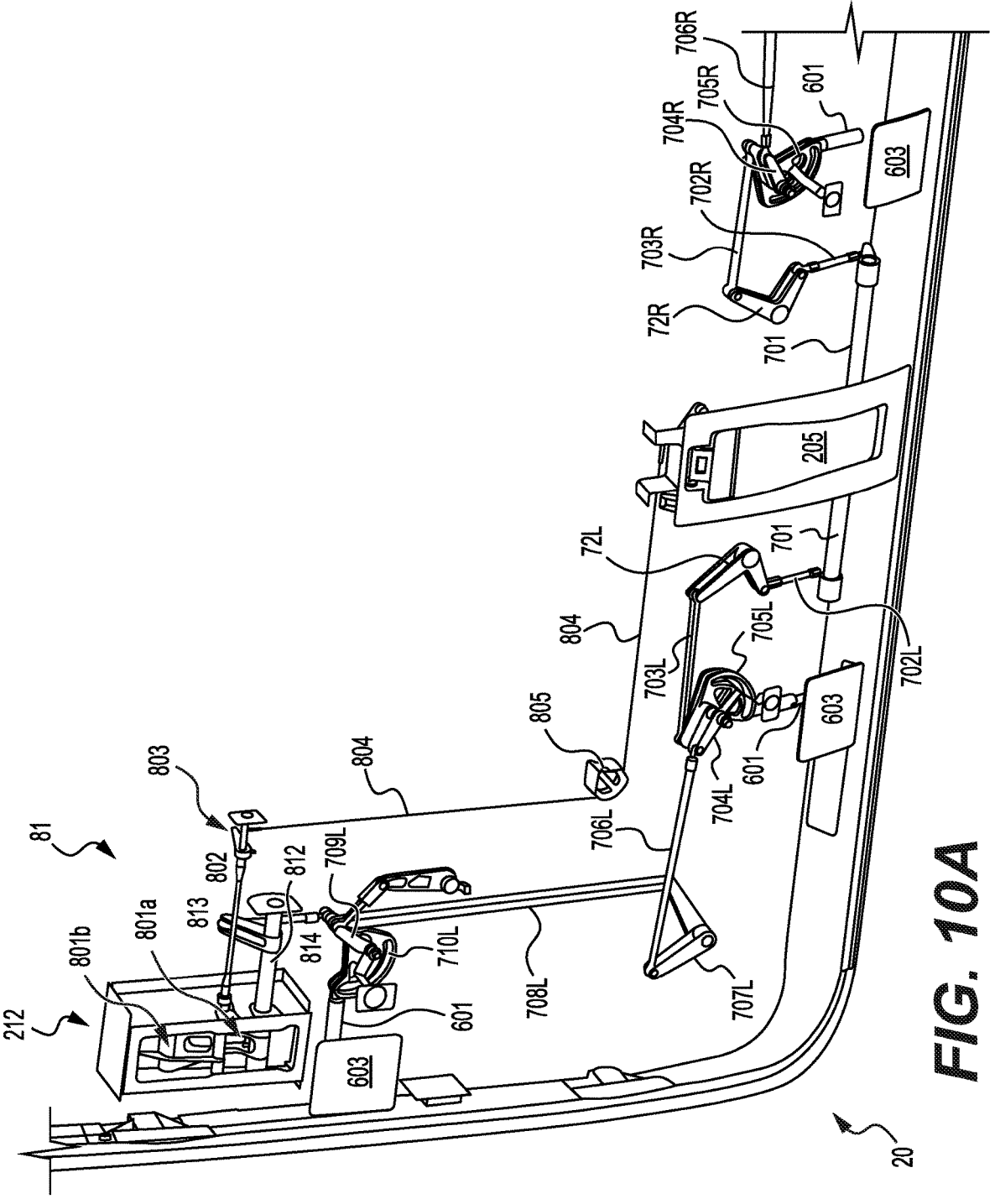
FIG. 10A illustrates a latching mechanism for a vehicle door, in an embodiment.

FIGS. 7, 9, and 10A show exterior handle 205 and interior handle assembly 212 (FIG. 9) from different sides. The actuation of exterior handle 205 actuates latching mechanism 70. Interior handle assembly 212 (FIG. 9) and exterior handle 205 are both mechanically coupled to latching mechanism 70 such that both handles may be used to operate latching mechanism 70 directly. When exterior handle 205 on door 20 is actuated, axle 701 rotates (see FIG. 7). The rotation of axle 701 actuates a left mechanical-arm assembly 702L and a right mechanical-arm assembly 702R, as viewed when facing exterior handle 205 from the exterior of the vehicle. Mechanical push-rod assemblies 702L, 702R as shown each taking the rotation of the axle 701 to pivot bellcrank arrangements 72L and 72R, respectively. Bellcranks 72L and 72R have centers which are pivotally mounted on door leaf structures.

The arm assemblies may also be mechanically coupled together with other components and configured for translating motion from axle 701 to door pins 601, as further described below. There may be a plurality of mechanical arms that axle 701 actuates having similar or nearly identical configurations without departing from the scope hereof. For example, the operation of latching mechanism 70 will be described for the left side. The same principles of operation of latching mechanism 70 on the left side may similarly or identically applied to latching mechanism 70 on the right side.

Mechanical-arm assembly 72L is attached to beam 703L, which is attached to seesaw 704L. Cam 705L is also attached to seesaw 704L, such that axle 701, arm assembly 702L, beam 703L, seesaw 704L, and cam 705L move in unison. Cam 705L is attached to a pin 601, and cam 705L and pin 601 are mechanically coupled such that when cam 705L is rotated, pin 601 is pushed into pin receptacle 602 established in the door frame, thereby latching door leaf 201 into doorframe 202. Additionally, a rod 706L is coupled to seesaw 704L. Bellcrank 707L is coupled to rod 706L, beam 708L is coupled to bellcrank 707L, seesaw 709L is coupled to beam 708L, and cam 710L is coupled to seesaw 709L. Therefore, seesaw 704L, rod 706L, bellcrank 707L, beam 708L, seesaw 709L, and cam 710L cooperate to drive the pin 601. Cam 710L rotates to drive the pin 601 into pin receptacle 602, thereby latching door leaf 201 into doorframe 202.

Similarly, on the right side, mechanical arm assembly 702R is attached to beam 703R, which is attached to seesaw 704R. Cam 705R is also attached to seesaw 704R, such that axle 701, arm assembly 702R, beam 703R, seesaw 704R, and cam 705R move in unison. Cam 705R is attached to a pin 601, and cam 705R and pin 601 are mechanically coupled such that when cam 705R is rotated, pin 601 is pushed into pin receptacle 602, thereby latching door leaf 201 into doorframe 202. Additionally, a rod 706R is coupled to seesaw 704R, bellcrank 707R is coupled to rod 706R, beam 708R is coupled to bellcrank 707R, seesaw 709R is coupled to beam 708R, and cam 710R is coupled to seesaw 709R. Therefore, seesaw 704R, rod 706R, bellcrank 707R, beam 708R, seesaw 709R, and cam 710R move in unison. Cam 710R is attached to a pin 601 such that when cam 710R is rotated, pin 601 is pushed into pin receptacle 602, thereby latching door leaf 201 into doorframe 202.

In embodiments, a plurality of pins 601 are provided in door leaf 201. For example, a second pin 601 may be actuated by rotation of cam 710R on the opposite side of door 20. In embodiments, mechanical system 70 is configured such that the plurality of pins 601 are translated substantially the same distance and enter respective pin receptacles 602 substantially simultaneously. A shape of the ends of each of the plurality of pins 601 may be configured to enhance receipt. For example, the pin ends may have tapered or rounded ends. The shape of the pin ends along with the position of door 20 and a set gap between door 20 and doorframe 202 are configured to engage pin receptacles 602 and then progressively draw door leaf 201 into doorframe 202. When pins 601 are received in pin receptacles 602, door leaf 201 becomes latched to doorframe 202. At this point, step 1150 is reached as door closure process 110 is complete.

As viewable in FIG. 7, a pair of gas struts 204 connect via one end to doorframe 202 and assist with opening of door 20 and maintaining door 20 in an open position. Additionally, a spring 713 is an inertia spring that holds latching mechanism 70 in the fully latched and locked position during flight via an arm assembly 712 and a hinge 711 (see FIGS. 7 and 9). Spring 713 also has the added benefit of opening latching mechanism 70 fully open due to over-centering.

Figure 10B:
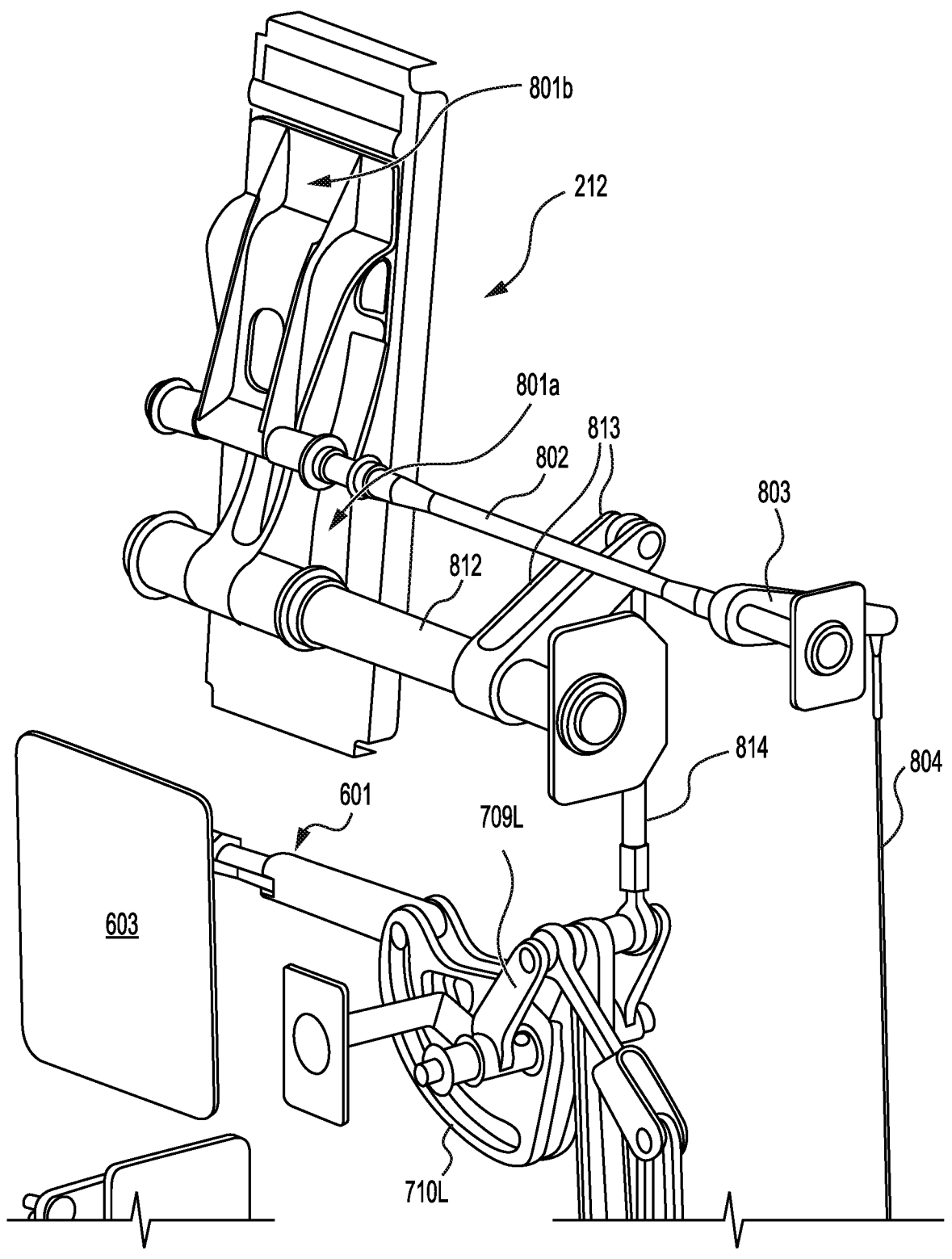
FIG. 10B illustrates components of the latching mechanism of FIG. 10A.
Figure 11A:
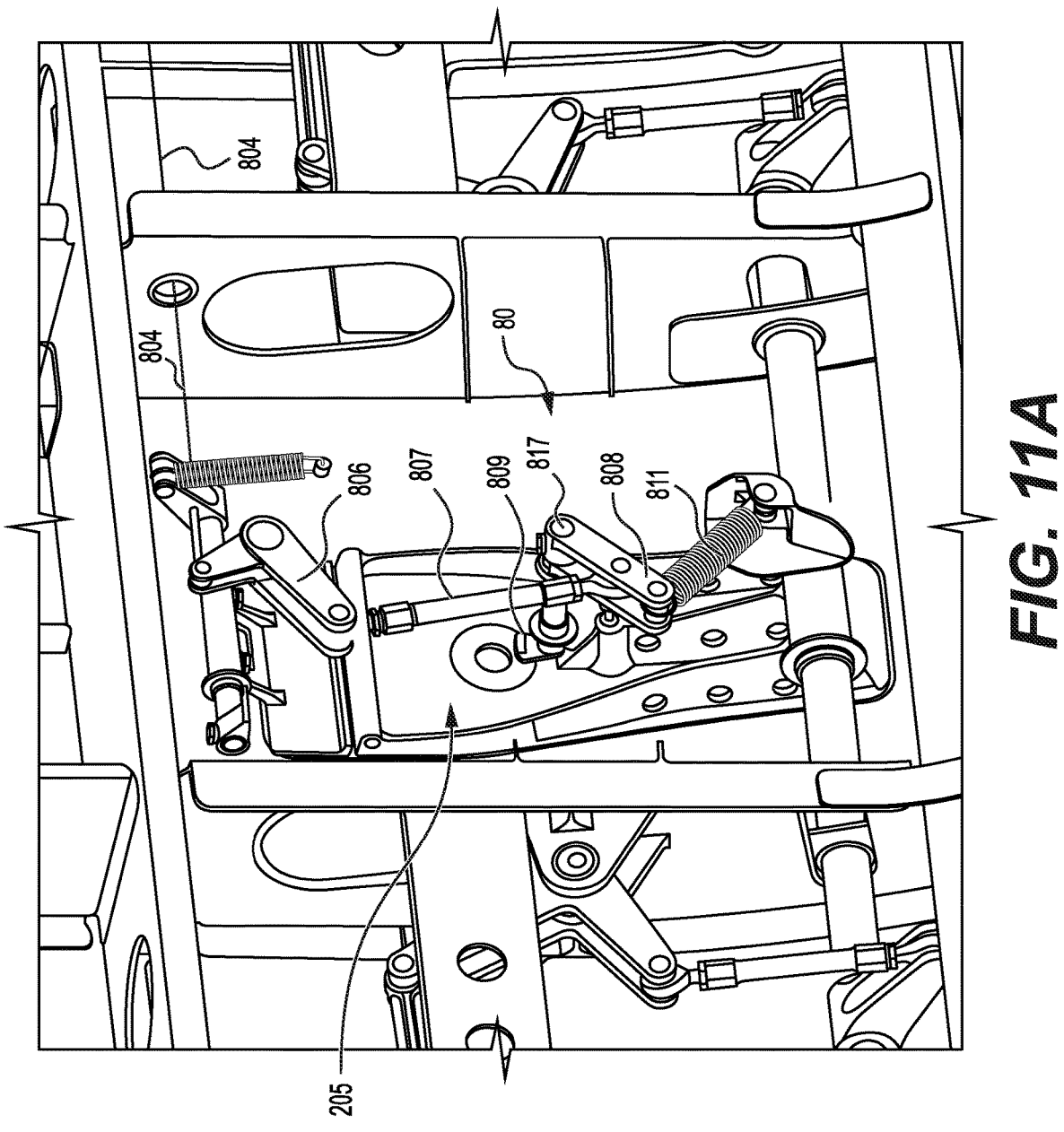
FIG. 11A illustrates components of a lock defeat mechanism, in an embodiment.
Figure 11B:
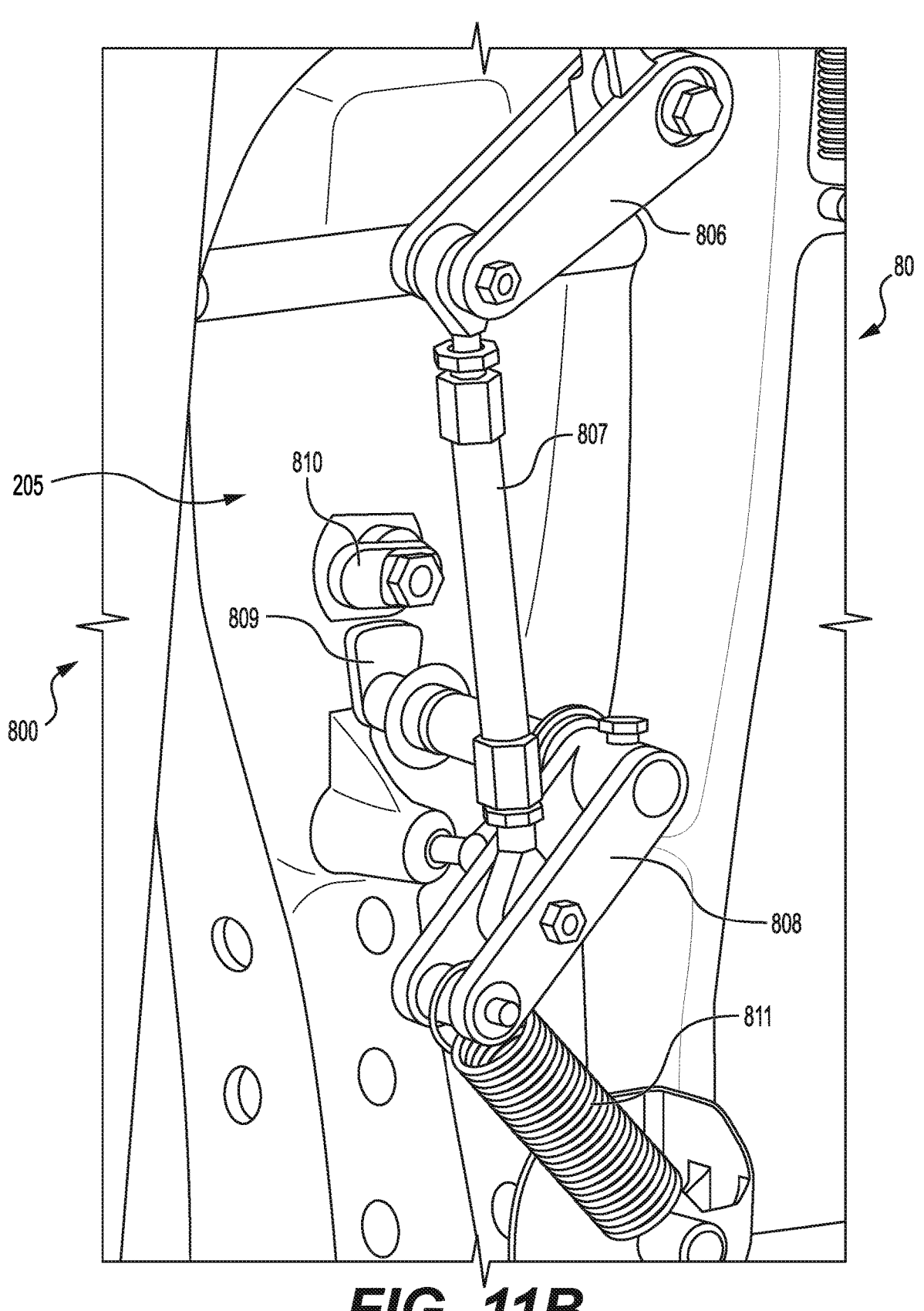
FIG. 11B illustrates the lock defeat mechanism of FIG. 11A with a lock tab in an unlocked position.

FIGS. 10A, 10B, and 11A-D contain depictions of an embodiment of lock defeat mechanism 80 (see FIG. 11B). Interior handle assembly 212 comprises two parts, handle 801*a* and paddle 801*b*. Paddle 801*b* is actuated by pushing inwards. Handle 801*a* is actuated by pulling downwards and outwards. When a user reaches to grab handle 801*a*, the operator's fingers push the paddle 801*b* out of the way to gain access to the handle 801*a*. Paddle 801*b* actuates lock defeat mechanism 80 while handle 801*a* actuates door latching mechanism 70. In operation both mechanisms 70 and 80 are actuated in series with a simple single-action motion by the user. Similarly, exterior handle 205 comprises a handle disposed above a paddle in which the user pushed the paddle out of the way while grabbing the handle to actuate both the lock defeat mechanism 80 and the door latching mechanism 70 with a simple single-action motion by the user.

When paddle 801*b* is actuated, lock defeat mechanism 80 defeats lock tab 810, effectively unlocking any key lock to exterior handle 205. When handle 801*a* is actuated, latching mechanism 70 unlatches door leaf 201 and allows door 20 to be opened.

Regarding paddle 801*b* on interior handle assembly 212 in particular, FIGS. 9, 10A, and 10B are referred to. Referring to FIG. 10B, when paddle 801*b* is actuated, a shaft 802 is rotated. Shaft 802 is coupled to an arm 803, which is coupled to cable 804, which is wrapped around a fairlead 805 (see FIG. 10A) that the cable 804 slides along. Referring to FIG. 9, cable 804 is further coupled to a bellcrank 806, which is coupled to a rod 807, which, using energy from the bellcrank, drives an intermediate portion of a seesaw 808, which has an axle 817 which is also connected to the lock cam 809, a portion of which is positioned in front of lock tab 810. Please note that the lock arrangement including lock tab 810 have been removed in FIG. 11A, but can be seen as installed in FIGS. 11B, 11C, and 11D in detail. Due to these couplings, when paddle 801*b* is actuated and shaft 802 is rotated, lock cam 809 is rotated entirely out of the way of lock tab 810, and the key lock to handle 205 is overcome. A spring 811 provides cable tension and returns the lock defeat mechanism 80 back to the starting position after paddle 801*b* is released.

When handle 801*a* is actuated, rod 812 of side mechanism 81 is rotated. Rod 812 is connected to arm 813, which is connected to rod 814, which is connected to seesaw 709L of latching mechanism 70. When handle 801*a* is actuated and rod 812 is rotated, seesaw 709L is thus moved, and the rest of latching mechanism 70 is engaged. This effectively unlatches door leaf 201 as if exterior handle 205 had been actuated to unlatch latching mechanism 70.

Figure 11C:
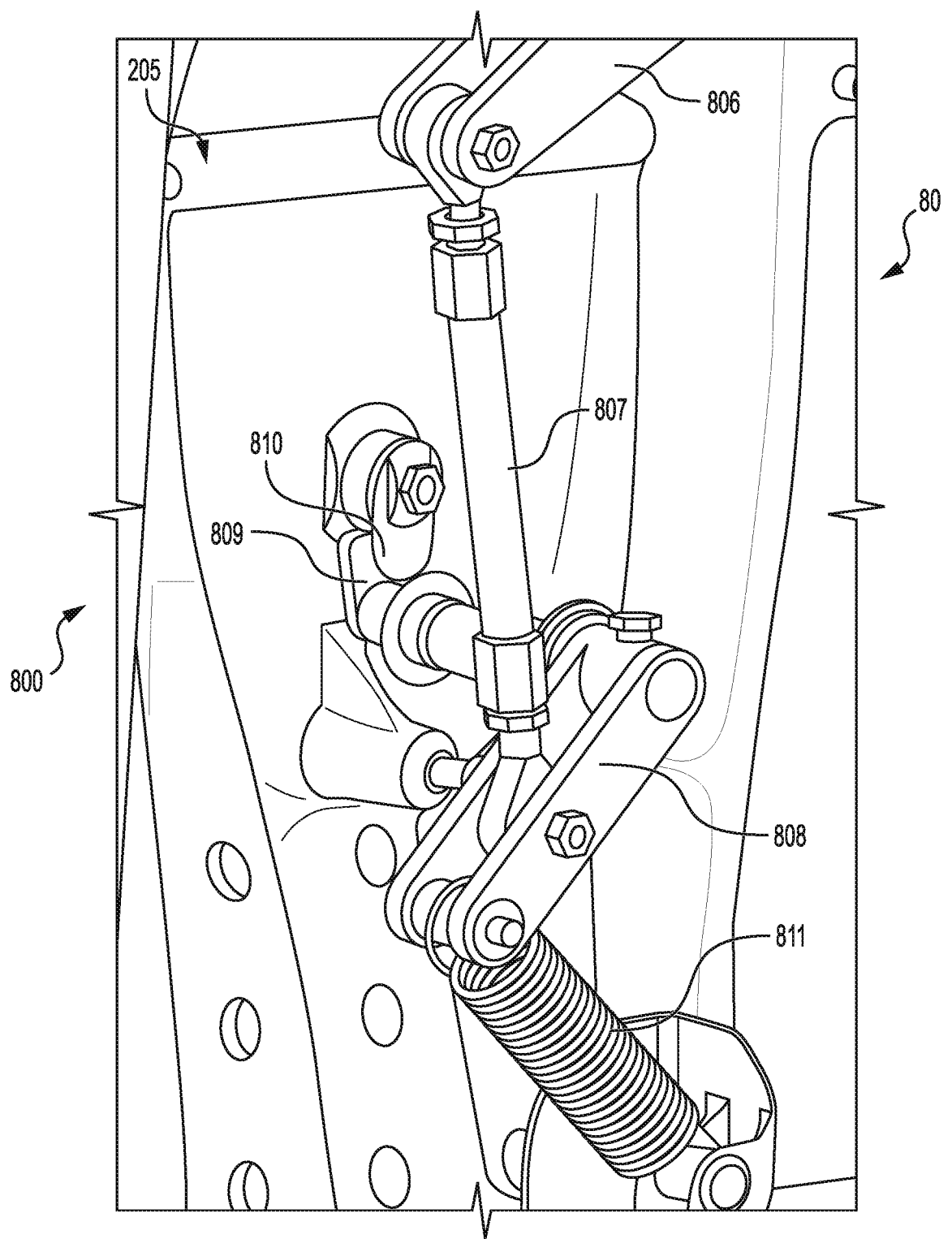
FIG. 11C illustrates the lock defeat mechanism of FIG. 11A with the lock tab in a locked position.
Figure 11D:
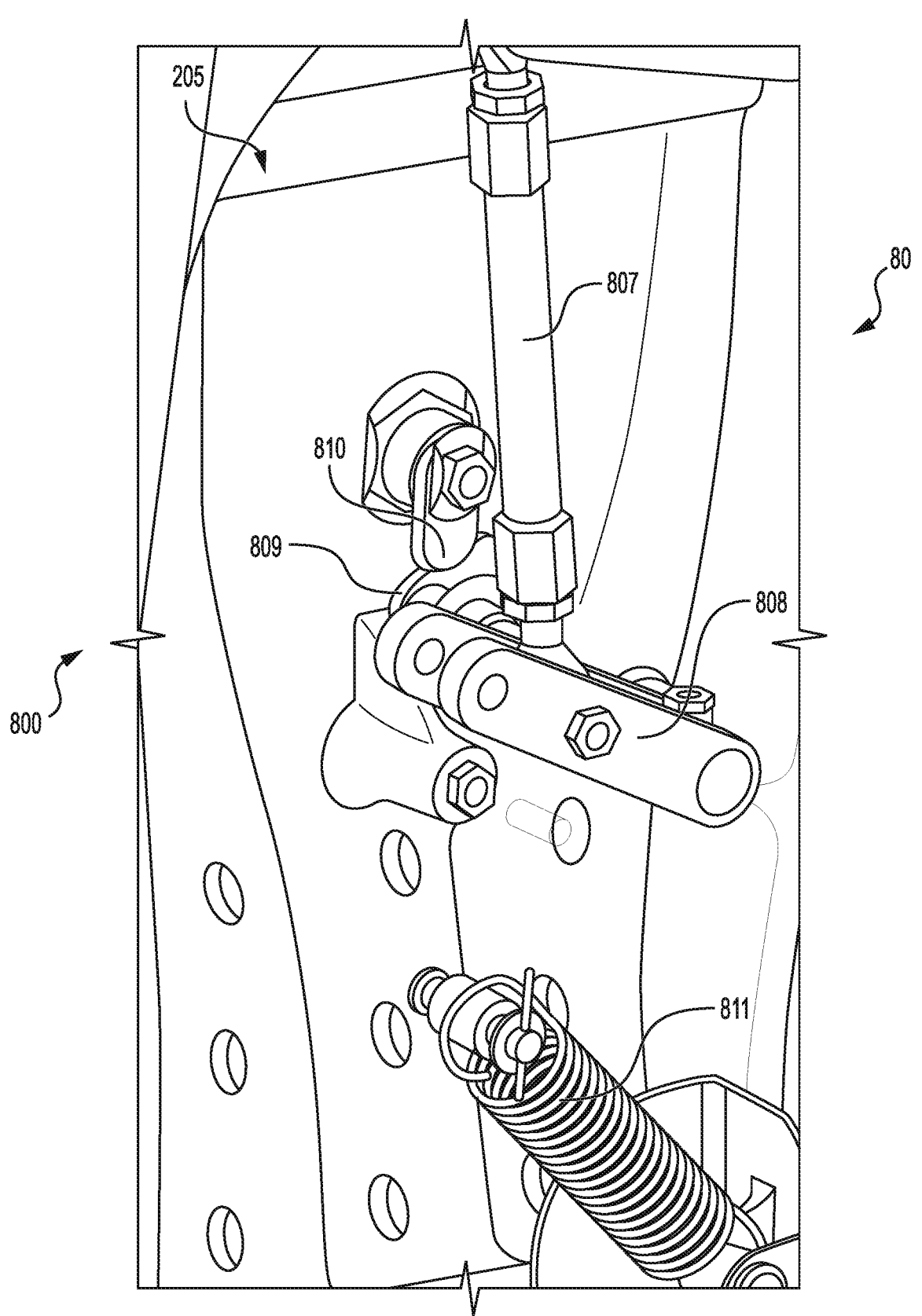
FIG. 11D illustrates the lock defeat mechanism of FIG. 11A with the lock tab in a locked position and the lock defeat mechanism actuated.

FIG. 11A shows components of lock defeat mechanism 80 installed on exterior handle 205 with the actual lock assembly including lock tab 810 removed (before install for the purpose of clarity). FIGS. 11B through 11D are best viewed together with the following description.

FIG. 11B shows a lock mechanism 800 with a lock tab 810 in an unlocked position.

Note that lock tab 810 does not overlap lock cam 809 such that lock mechanism 800 is disengaged. When a security key is used on exterior handle 205, the security key may be rotated, which rotates lock tab 810 to a locked position shown in FIG. 11C.

FIG. 11C shows lock mechanism 800 with lock tab 810 in the locked position. Note that lock tab 810 overlaps and engages with lock cam 809. This arrangement prevents exterior handle 205 from being rotated open.

FIG. 11D shows lock mechanism 800 with lock tab 810 in the locked position but with lock defeat mechanism 80 having been actuated. When lock defeat mechanism 80 is actuated, rod 807 pushes upwardly and rotates seesaw 808, which rotates lock cam 809 to disengage from, and not overlap with, lock tab 810. In this manner, lock defeat mechanism 80 overcomes lock mechanism 800 to unlock the door.

Figure 12A:
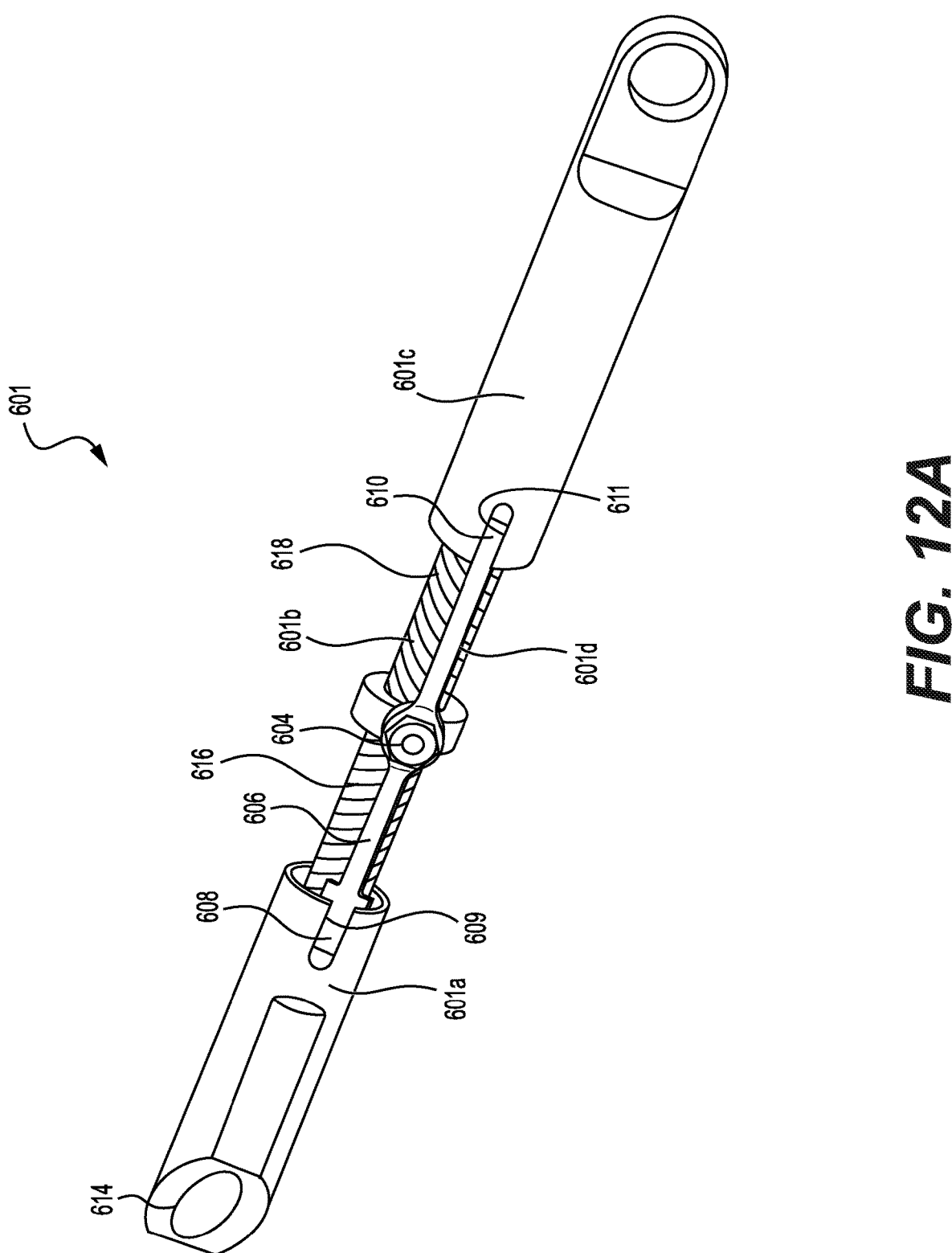
FIG. 12A illustrates elements of a door pin for latching a door, in an embodiment.

FIG. 12A shows an exemplary pin 601. Pin 601 includes a substantially cylindrical extending member 601*a*. The side of member 601*a* includes a central threaded rod 601*b*. A pin bearing end 601*c* drives the pin 601 either in or out of a doorframe receptacle by rotation imparted by a translation imparting driving mechanism, e.g., a cam 710L (e.g., see FIG. 12C) in ordinary operation. One side of the bearing end 601*c* is attached to the cam driving system 710L. The other side of the bearing end includes an internally threaded bore that receives the central threaded rod 601*b*.

An extending member 601*a* exists on the other end of pin 601 and is used to latch the door (along with a plurality of other similarly configured pins). Extending member 601*a* is the segment of pin 601 that includes an insertion pin end 614. Insertion pin end 614, during a latching procedure, is received and secured into a pin receptacle 602. In the disclosed embodiment, end 614 is angled to aid with locating and insertion. Penetration past the angled portion of insertion end 614 to reach the rest of the body of the extending member 601*a* results in the extending member being snugly fit within fitting members 602*a* on pin receptacle 602 (see FIG. 12B).

A threaded bore established in extending member 601*a* includes internal threads which are received onto one end of central threaded rod 601*b*. Threaded rod 601*b* has an activation mechanism 601*e* which is coaxial with the rod and separates a first set of threads in a first orientation 616 from a second set of threads in a second opposite orientation 618. The internal threads inside the extending member 601*a* are configured to receive the first set of threads having the first orientation 616, and the internal threads existing in the pin bearing end 601_c_ are configured to receive second set of threads having the second orientation 618. The reverse thread orientations cause the extending member 601_a_ and pin bearing end 601_c_ to converge upon rotation of the central threaded rod 601_b_ in a first axial direction, and to expand away from one another upon rotation in a second axial direction.

A pin keeper 601_d_ has a body 604. Pin keeper 601_d_ is established to set an ordinary use length of pin 601. Pin keeper 601_d_ may be secured to central threaded rod 601_b_ via a fastener 606 such as a screw or bolt. A first end 608 of pin keeper 601_d_ fits snugly in a groove 609 of extending member 601_a_ and a second end of pin keeper 601_d_ fits snugly in a groove 611 of pin bearing end 601_c_. Outwardly extending tangs 620 at each end of the pin keeper 601_d_ provide a limit against retraction of the pin bearing 601_c_ towards the extending member 601_a_ setting a standard overall length for the pin system 601. When pin keeper 601_d_ is removed pin 601 may be retracted as described below.

Figure 12B:
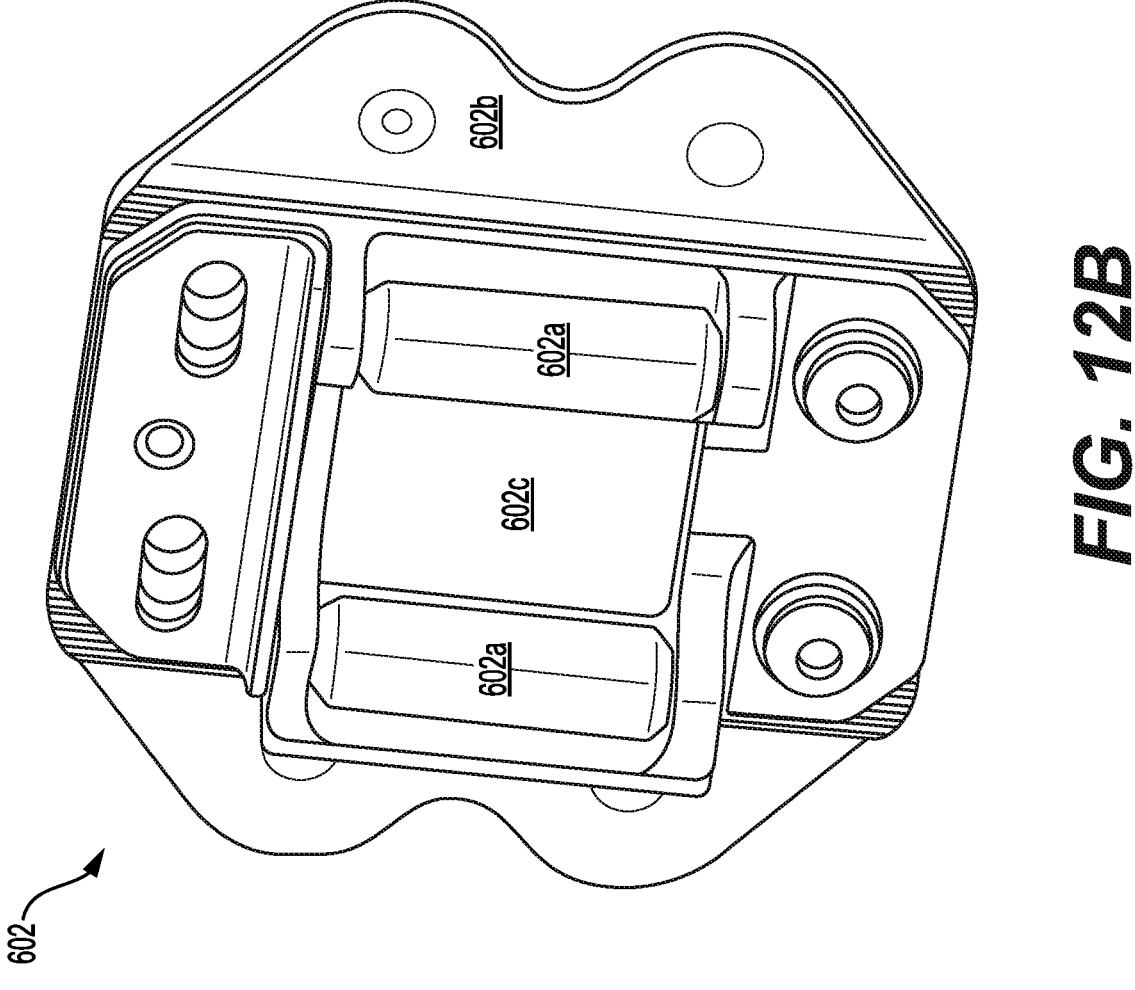
FIG. 12B illustrates a receptacle for receiving the door pin of FIG. 12A, in an embodiment.

FIG. 12B provides a close-up view of pin receptacle 602. Pin receptacle 602 comprises mounting frame 602_b_, which contains holes through which screws can be threaded to attach pin receptacle 602 to a surface. Any pin 601 inserted into pin receptacle 602 is held within pin space 602_c_. Pin space 602_c_ is of a substantially rectangular shape. Each of two fitting members 602_a_ are placed on opposite sides of pin space 602_c_. Fitting members 602_a_ are for example rollers attached to mounting frame 602_b_ on opposing sides of pin space 602_c_. Fitting members 602_a_ may comprise a cylindrical geometry aligned adjacent pin space 602_c_. When extending member 601_a_ of pin 601 approaches and enters pin space 602_c_, fitting members 602_a_ assist entry of pin 601 into pin receptacle 602.

FIG. 12C shows pin 601 within pin receptacle 602. When door leaf 201 is received within doorframe 202, extending member 601_a_ of pin 601 is received in pin receptacle 602 to latch door 20. Specifically, when latching mechanism 70 is actuated to latch door 20, the rotation of cam 710L, which is coupled to pin bearing end 601_c_, moves extending member 601_a_ into pin space 602_c_ of pin receptacle 602.

Figure 12D:
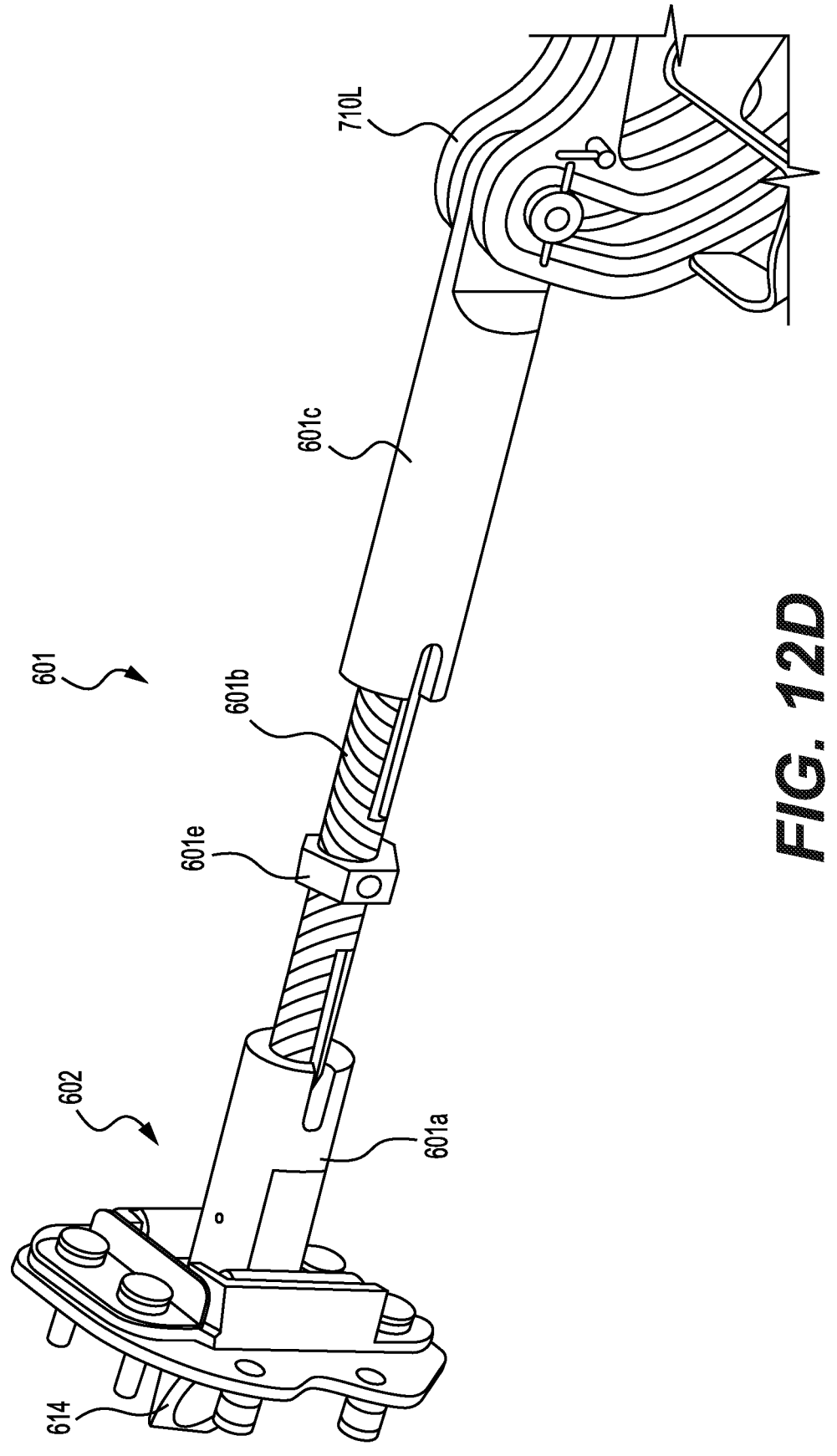
FIG. 12D illustrates the door pin of FIG. 12C with a pin keeper removed.

FIG. 12D shows pin 601 with pin keeper 601_d_ removed revealing grooves in extending member 601_a_, central threaded rod 601_b_, and pin bearing end 601_c_. With pin keeper 601_d_ removed, central threaded rod 601_b_ may be turned via the actuation mechanism 601_e_. In the disclosed embodiments, activation mechanism 601_e_ is configured to receive a tool. In even more specific embodiments, activation mechanism is a hex portion 601_e_ configured to receive a wrench or other tool. Hex portion 601_e_ is integral and unmovable with respect to the central threaded rod 601_b_. Because of that, the rod 601_b_ rotates with the bolt.

In the case of a malfunction of latching mechanism 70, the pin would ordinarily become stuck in the receptacle, requiring serious maintenance issues, and possibly creating hazardous conditions in a state of emergency. Here, however, hex portion 601_e_ can be turned to retract the pin 601 by shortening the overall length of the device. This enables manual withdrawal of the pin 601 from pin receptacle 602.

Again, the threaded portions 616 and 618 of central threaded rod 601_b_ are opposites, and thus the corresponding threads of extending member 601_a_ and pin bearing end 601_c_ have opposite threads. Thus, turning of hex portion 601_e_ draws both extending member 601_a_ and pin bearing end 601_c_ together as shown in FIG. 12E.

Figure 12E:
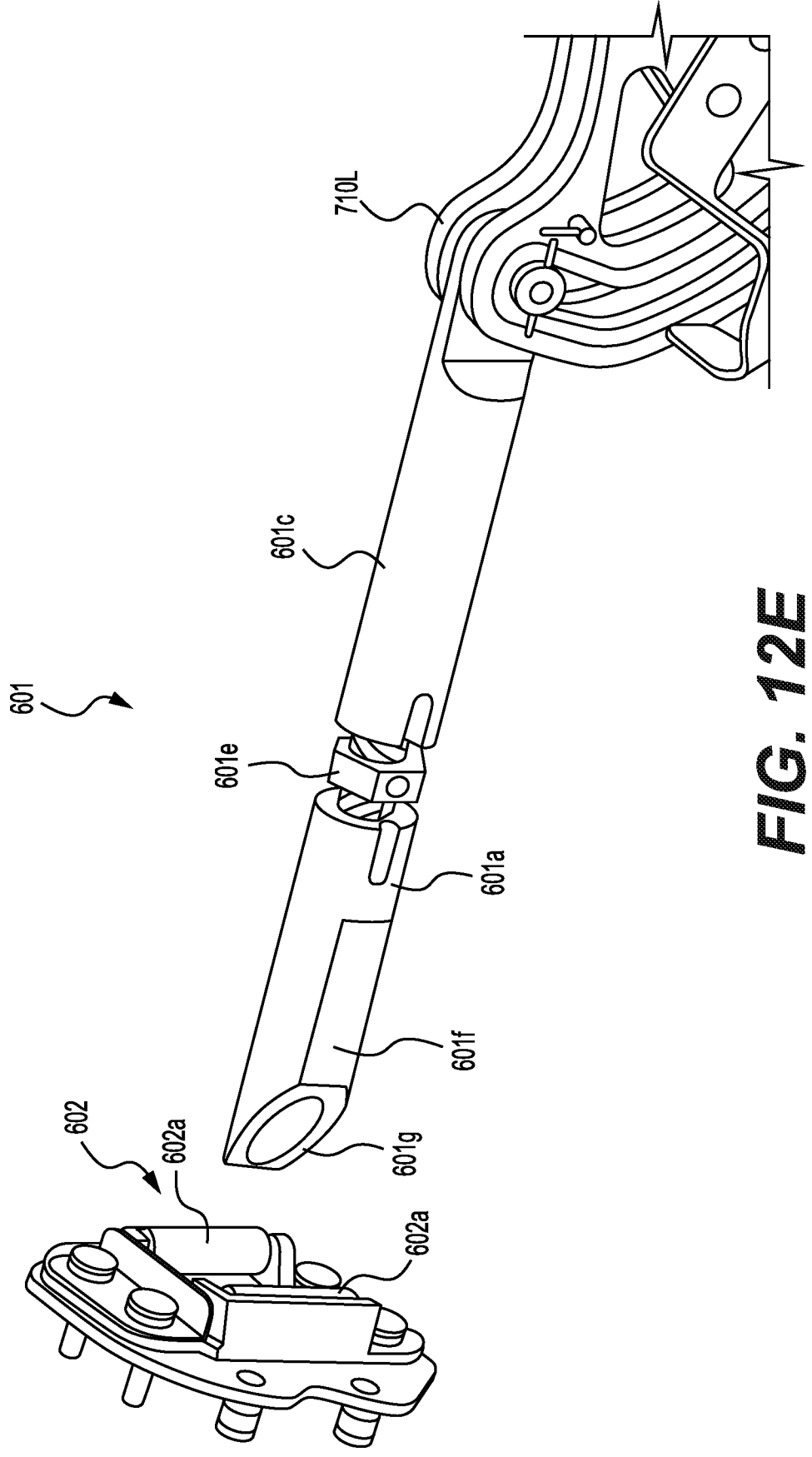
FIG. 12E illustrates the door pin of FIG. 12D having been manually withdrawn from the receptacle of FIG. 12B, in an embodiment.

FIG. 12E shows pin 601 with pin keeper 601_d_ removed and hex portion 601_e_ turned to manually shorten pin 601 for retracting from pin receptacle 602. Note that extending member 601_a_ comprises a flat portion 601_f_ best viewed in FIG. 12E. Flat portion 601_f_ prevents extending member 601_a_ from spinning when hex portion 601_e_ is turned so that extending member 601_a_ moves longitudinally with respect to central threaded rod 601_b_ along the threads. In embodiments, extending member 601_a_ includes a tapered end 601_g_ for assisting with insertion into pin receptacle 602.

Pin 601 is configured for hex portion 601_e_ to be easily reached from an access panel 603 (see FIG. 7) while extending member 601_a_ is sitting securely within a pin receptacle 602. A length of pin 601 may depend upon the position of pin receptacle 602, the position of access panel 603, and other characteristics of door 20.

In embodiments, pin 601 provides a door pin assembly for use with door 20 described above. As shown in previous figures, pin 601 may be positioned behind access panel 603. Any access panel 603 may be accessed using hand tools such as a screwdriver, wrench, hex driver, crowbar, or any similar tool. Pin keeper 601_d_ may be removed from pin 601. With pin keeper 601_d_ removed, threaded rod 601_b_ may be adjusted with an open-end-wrench or a similar hand tool. Because rod 601_b_ is threaded and extending member 601_a_ is screwed into rod 601_b_, rotation of rod 601_b_ retracts extending member 601_a_ from any pin receptacle 602 that it resides in. When this is done to all pins 601 in a door 20, the door leaf 201 of door 20 is unlatched, allowing door 20 to be opened without actuation of either latching mechanism 70 or lock defeat mechanism 80.

Although the invention has been described with reference to the embodiments illustrated in the attached drawing figures, it is noted that equivalents may be employed and substitutions made herein without departing from the scope of the invention as recited in the claims.

The invention claimed is:

1. An aircraft door comprising:
   an exterior door handle assembly including a key-operated lock, the key-operated lock being operable to a locked position where an outstanding tab on the key-operated lock is rotated between a first locked position and a second unlocked position;
   an interior door handle assembly including a paddle portion and a handle portion, wherein the paddle portion and the handle portion are configured in such a way that the action of operating the handle portion causes the actuation of the paddle portion, the paddle portion being operably linked via a mechanical system to an opposing outwardly extending blocking member;
   the blocking member, when the paddle portion is not being actuated by a user, and when the key-operated lock is in the locked position, existing in blocking mode where the outstanding tab overlaps and engages with the blocking member and prevents an opening of the door; and
   the blocking member, when the paddle portion is actuated by a user, existing in an unblocked mode where the outstanding tab of the key-operated lock overlaps and engages with the blocking member and does not block opening of the door on an actuation of the handle on the exterior door assembly.

2. The aircraft door of claim 1 wherein the blocking member is a cam on an axis of rotation internal to the door.

3. The aircraft door of claim 1 wherein the mechanical system includes a rod configured to rotate about the longitudinal axis upon activation of the paddle, the rod imparting rotation used in operating the blocking member.

4. The aircraft door of claim 1 wherein the mechanical system includes a shaft with two ends and a centerpoint on each end, configured to rotate on an axis defined by the centerpoints of the ends of the shaft upon activation of the paddle, the shaft imparting rotation used in operating the blocking member.

5. The aircraft door of claim 4 wherein the mechanical system includes an arm that imparts tension into a cable, the cable contributing in imparting rotation of the blocking member.

6. The aircraft door of claim 5 wherein the mechanical system includes a fairlead that the cable slides around to reach a bellcrank which is included in the imparting of rotation to the blocking member.

7. The aircraft door of claim 6 wherein the mechanical system includes a rod which is driven by the bellcrank to contribute to the rotation of the blocking member.

8. The aircraft door of claim 7 wherein the mechanical system includes a seesaw rotating on an axle at a first end, the seesaw being configured to receive pressure from the rod at an intermediate location and cause the axle to operate the blocking member into an unlocked position.

9. The aircraft door of claim 8 wherein the mechanical system includes a tension spring attached to a second end of the seesaw, the tension spring having a tension level, the tension spring biasing the blocking member towards blocked mode when the paddle is not being depressed by a user to overcome the tension level provided by the tension spring.

10. An aircraft door comprising:

an exterior handle system having a lock tab which rotates to catch on an axially mounted blocking member when in locked mode and is rotatable to an unlocked mode where the tab does not catch on the blocking member;

an interior handle system including a paddle which is operated by a user to gain the ability to operate a handle in the interior handle system, wherein the paddle and the handle are configured in such a way that the action of operating the handle portion causes the actuation of the paddle portion; and the paddle rotating on a shaft, the shaft configured to impart mechanical rotation to the blocking member via a mechanical system.

11. The aircraft door of claim 10 wherein the blocking member is a cam on an axis of rotation internal to the door.

12. The aircraft door of claim 10 wherein the mechanical system includes an arm on the shaft imparts tension into a cable, the cable contributing to impart rotation of the blocking member.

13. The aircraft door of claim 12 wherein the cable slides around a fairlead in imparting rotation to the blocking member.

14. The aircraft door of claim 13 wherein the cable, after sliding around the fairlead, rocks a bellcrank to impart rotation to the blocking member.

15. The aircraft door of claim 14 wherein the mechanical system includes a rod which is driven by the bellcrank to contribute to the rotation of the blocking member.

16. The aircraft door of claim 15 wherein the mechanical system includes a seesaw which operates on an axle, the seesaw being rocked at a first end by the rod resulting in a rotation of the axle on which the blocking member is rotatable into an unlocked position.

17. The aircraft door of claim 16 wherein a tension spring is attached to a second end of the seesaw, the tension spring having a tension level, the tension spring biasing the blocking member towards blocked mode when the paddle is not being depressed by a user.

18. A lock-defeat process for use with a door having a first handle having a key-lock arrangement on a first side of the door and a paddle associated with a second handle existing on a second side of the door, the process comprising:

mechanically linking the paddle associated with the second handle to the key-lock associated with the first handle such that the operation of the paddle maintains an unlatching of the key-lock, and configuring the paddle and the second handle in such a way that the action of operating the second handle causes the actuation of the paddle.

19. The lock-defeat process of claim 18 comprising:

accepting rotation from the paddle to rotate a cam away from a blocked position to defeat the key-lock.

20. The process of claim 19 comprising:

accomplishing the accepting step by receiving drive from the paddle into an intermediate portion of a seesaw rotating on an axle, and biasing an opposite end of the seesaw using a tension spring to return the cam to a blocking position upon a release of the paddle.

* * * * *